(12) United States Patent
Kuhara

(10) Patent No.: US 9,886,863 B2
(45) Date of Patent: Feb. 6, 2018

(54) METHOD FOR GENERATING FLIGHT ROUTE WITH WHICH OBSERVER CAN VISUALLY OBSERVE DRONE

(71) Applicant: Panasonic Intellectual Property Corporation of America, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/434,112

(22) Filed: Feb. 16, 2017

(65) Prior Publication Data

US 2017/0162063 A1   Jun. 8, 2017

Related U.S. Application Data

(63) Continuation of application No. PCT/JP2016/003251, filed on Jul. 8, 2016.
(Continued)

(30) Foreign Application Priority Data

Feb. 17, 2016 (JP) ................................ 2016-028062
Jun. 21, 2016 (JP) ................................ 2016-122413

(51) Int. Cl.
*G08B 23/00* (2006.01)
*G08G 5/00* (2006.01)
(Continued)

(52) U.S. Cl.
CPC ......... *G08G 5/0069* (2013.01); *B64C 39/024* (2013.01); *G05D 1/0016* (2013.01); *B64C 2201/141* (2013.01); *B64C 2201/146* (2013.01)

(58) Field of Classification Search
None
See application file for complete search history.

(56) References Cited

U.S. PATENT DOCUMENTS

2005/0206533 A1* 9/2005 Rogers ................... G01C 23/00
340/979
2007/0048084 A1* 3/2007 Jung ......................... G09F 9/30
404/9
(Continued)

FOREIGN PATENT DOCUMENTS

JP    2010-152834    7/2010

OTHER PUBLICATIONS

International Search Report of PCT application No. PCT/JP2016/003251 dated Aug. 16, 2016.

*Primary Examiner* — Adolf Dsouza
(74) *Attorney, Agent, or Firm* — Greenblum & Bernstein, P.L.C.

(57) ABSTRACT

A method for generating a flight route includes receiving an unconfirmed flight route of a drone, displaying a visually observable area based on a position of an observer who visually observes the drone, confirming, if the unconfirmed flight route is entirely included in the visually observable area, the unconfirmed flight route as a confirmed flight route, and displaying, if at least a part of the unconfirmed flight route is not included in the visually observable area, a warning message indicating that the unconfirmed flight route is not confirmed.

10 Claims, 15 Drawing Sheets

Related U.S. Application Data

(60) Provisional application No. 62/214,476, filed on Sep. 4, 2015.

(51) Int. Cl.
*G05D 1/00* (2006.01)
*B64C 39/02* (2006.01)

(56) References Cited

U.S. PATENT DOCUMENTS

2013/0270394 A1* 10/2013 Downs ................. G05D 1/0027
 244/76 R
2016/0027292 A1* 1/2016 Kerning ................. G08B 25/10
 455/404.2

* cited by examiner

METHOD FOR GENERATING FLIGHT ROUTE WITH WHICH OBSERVER CAN VISUALLY OBSERVE DRONE

BACKGROUND

1. Technical Field

The present disclosure relates to a method, an apparatus, a computer-readable non-transitory recording medium storing a program, and a terminal apparatus that generate a flight route of a drone.

2. Description of the Related Art

During these years, small drones that autonomously fly predetermined flight routes have been developed. Such a drone includes propellers and can freely fly through the air by controlling speeds of the propellers. The drone autonomously flies a predetermined flight route.

In Japanese Unexamined Patent Application Publication No. 2010-152834, for example, a remote control apparatus includes running instruction means that makes a movement instruction by superimposing a turning position at which an unmanned vehicle is to be turned and an operation icon associated with a movement direction at the turning position at a specified position in an image displayed on a display unit. The unmanned vehicle includes route planning means that plans a movement route for autonomous movement on the basis of the turning position and the movement direction at the turning position specified by the running instruction means, speed planning means that plans traveling speeds of the unmanned vehicle according to the movement route, and autonomous movement means that moves the unmanned vehicle in accordance with the planned movement route and traveling speeds.

Since a drone can freely fly through the air, regulations on the flight of various drones are being examined. For example, a regulation is being examined that allows a drone to fly only within an area in which an operator or a visual observer (VO), who visually observes the drone along with the operator, can visually observe the drone.

SUMMARY

The above example of the related art, however, needs further improvements.

In one general aspect, the techniques disclosed here feature a method used by an apparatus including an input and a display. The method includes receiving, using the input, an unconfirmed flight route of a drone, displaying the unconfirmed flight route and a visually observable area on the display, the visually observable area including a first area, within which an observer located at a first position is able to visually observe the drone, the observer being an operator of the drone or a first visual observer, confirming, if the unconfirmed flight route is entirely included in the visually observable area, the unconfirmed flight route as a confirmed flight route, and displaying, on the display, if at least a part of the unconfirmed route is not included in the visually observable area, a warning message indicating that the unconfirmed flight route is not confirmed.

According to the present disclosure, a flight route of a drone within an area in which an operator or a VO can visually observe the drone can be generated.

It should be noted that general or specific embodiments may be implemented as an apparatus a system, a method, an integrated circuit, a computer program, a computer-readable storage medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
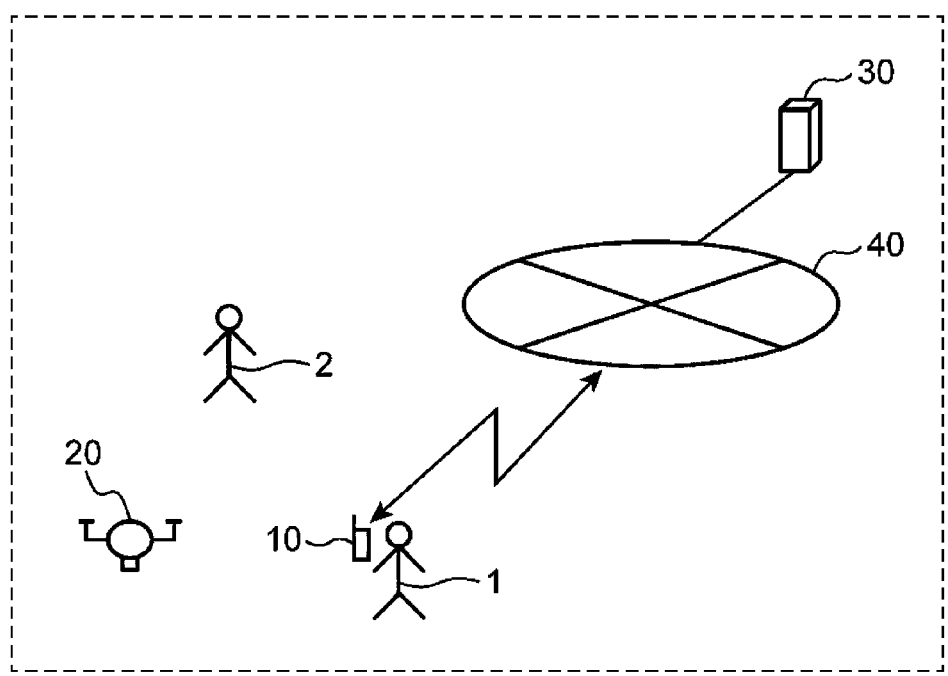
FIG. 1 is a diagram illustrating the configuration of a flight route generation system according to a first embodiment of the present disclosure.

Underlying Knowledge Forming Basis of Present Disclosure

Since a drone can freely fly through the air, regulations on the flight of various drones are being examined. For example, a regulation is being examined that allows a drone to fly only within an area in which an operator or a VO, who visually observes the drone along with the operator, can visually observe the drone.

Although, in the example of the related art, an unmanned vehicle plans a movement route for autonomously moving on the basis of a turning position and a movement direction, it is not disclosed how to cause the unmanned vehicle to autonomously move only within an area in which an operator or a VO can visually observe the unmanned vehicle.

A method according to an aspect of the present disclosure is a method used by an apparatus including an input and a display. The method includes receiving, using the input, an unconfirmed flight route of a drone, displaying the unconfirmed flight route and a visually observable area on the display, the visually observable area including a first area, within which an observer located at a first position is able to visually observe the drone, the observer being an operator of the drone or a first visual observer, confirming, if the unconfirmed flight route is entirely included in the visually observable area, the unconfirmed flight route as a confirmed flight route, and displaying, on the display, if at least a part of the unconfirmed route is not included in the visually observable area, a warning message indicating that the unconfirmed flight route is not confirmed.

With this configuration, an unconfirmed flight route is received. The unconfirmed flight route is displayed. A position of an operator of a drone or a first visual observer and a visually observable area based on the position of the operator or the first visual observer is displayed. If the unconfirmed flight route is entirely included in the visually observable area, the unconfirmed flight route is confirmed to generate a confirmed flight route. If a part of the unconfirmed flight route is not included in the visually observable area, a warning message indicating that the unconfirmed flight route is not confirmed is displayed.

A confirmed flight route, therefore, can be generated with which the drone flies within an area in which the operator or the visual observer can visually observe the drone.

In addition, the method may further include updating, if at least a part of the unconfirmed flight route is not included in the visually observable area, the visually observable area on the basis of a second position of a second visual observer, the updated visually observable area including a second area, within which the second visual observer located at the second position is able to visually observe the drone, receiving, using the input, confirmation of the second position of the second visual observer, and deleting, if the unconfirmed flight route is entirely included in the updated visually observable area, the warning message and confirming the unconfirmed flight route as a confirmed flight route.

With this configuration, if at least a part of the unconfirmed flight route is not included in the visually observable area, a position of a second visual observer and a visually observable area based on the position of the second visual observer are displayed. Confirmation of the position of the second visual observer is received. If the unconfirmed flight route is entirely included in the visually observable area, the warning message is deleted, and the unconfirmed flight route is confirmed to generate a confirmed flight route.

The operator, therefore, can check whether the unconfirmed flight route is entirely included in the visually observable area on the basis of whether the warning message is displayed. As a result, the operator can easily determine a position at which the operator or the visual observer is to be arranged and generate a confirmed flight route of a drone within an area in which the operator or the visual observer can visually observe the drone.

In addition, in the method, the unconfirmed flight route may include a first partial flight route included in the visually observable area and a second partial flight route not included in the visually observable area. The first partial flight route and the second partial flight route may be displayed in a distinguishable manner.

With this configuration, the first partial flight route included in the visually observable area and the second partial flight route not included in the visually observable area can be displayed in a distinguishable manner, and a position at which the visually observable area is to be arranged can be easily determined.

In addition, in the method, a position of the observer may be either fixed or not fixed. The visually observable area may include a third area whose position is not fixed and a fourth area whose position is fixed. The third area and the fourth area may be displayed in a distinguishable manner. If at least a part of the unconfirmed flight route is not included in the visually observable area, confirmation of the first position of the observer whose position is not fixed may be received. If the unconfirmed flight route is entirely included in the visually observable area, the warning message is deleted, and the unconfirmed flight route may be confirmed as a confirmed flight route.

With this configuration, a position of the observer or the first visual observer might be either fixed or not fixed. The visually observable area includes a moving visually observable area whose position is not fixed and a fixed visually observable area whose position is fixed. The moving visually observable area and the fixed visually observable area are displayed in a distinguishable manner. If at least a part of the unconfirmed flight route is not included in the visually observable area, confirmation of the position of the operator or the first visual observer whose position is not fixed is received. If the unconfirmed flight route is entirely included in the visually observable area, the warning message is deleted, and the unconfirmed flight route is confirmed to generate a confirmed flight route.

Since the moving visually observable area whose position is not fixed and the fixed visually observable area whose position is fixed are displayed in a distinguishable manner, a movable visually observable area can be easily found from a plurality of visually observable areas displayed. As a result, time taken to generate a confirmed flight route can be reduced.

In addition, the method may further include receiving, if at least a part of the unconfirmed flight route is not included in the visually observable area, a movement route for changing a position of the observer from the first position to a second position, displaying, on the display, a track of the visually observable area based on the movement of the observer from the first position to the second position as an extended visually observable area, and deleting, if the unconfirmed flight route is entirely included in the extended visually observable area, the warning message.

With this configuration, a movement route for changing a position of the operator or the first visual observer from the first position to a second position is received. A track of the visually observable area based on the movement of the operator or the first visual observer from the first position to the second position is displayed as an extended visually observable area. If the unconfirmed flight route is entirely included in the extended visually observable area, the warning message is deleted, and the unconfirmed flight route is confirmed to generate a confirmed flight route.

Since the visually observable area of the operator or the first visual observer can be enlarged by moving the operator or the first visual observer, the number of persons who visually observes the drone can be reduced.

In addition, in the method, the unconfirmed flight route may be input by specifying a waypoint.

With this configuration, the unconfirmed flight route is input by specifying a waypoint, and an event can be prevented in which the operator or the visual observer does not move and therefore does not visually observe the drone.

In addition, in the method, the unconfirmed flight route may be input by specifying a waypoint. The unconfirmed flight route may include a third partial flight route based on the movement route and a fourth partial flight route connecting the third partial flight route and the waypoint.

With this configuration, the unconfirmed flight route is input by specifying a waypoint. The unconfirmed flight route includes a third partial flight route based on the movement route and a fourth partial flight route connecting the third partial flight route and the waypoint. The drone, therefore, flies near the operator or the visual observer, and the operator or the visual observer can easily visually observe the drone.

An apparatus according to another aspect of the present disclosure includes an input that receives an unconfirmed flight route of a drone, a display, and circuitry which, in operation, displays the unconfirmed flight route and a visually observable area on the display, the visually observable area including a first area, within which an observer located at a first position is able to visually observe the drone, the observer being an operator of the drone or a first visual observer, confirms, if the unconfirmed flight route is entirely included in the visually observable area, the unconfirmed flight route as a confirmed flight route, and displays, on the display, if at least a part of the unconfirmed route is not included in the visually observable area, a warning message indicating that the unconfirmed flight route is not confirmed.

With this configuration, an unconfirmed flight route of a drone is received. A position of an operator of the drone or a first visual observer and a visually observable area based on the position of the operator or the first visual observer is displayed. If the unconfirmed flight route is entirely included in the visually observable area, the unconfirmed flight route is generated to generate a confirmed flight route. If at least a part of the unconfirmed route is not included in the visually observable area, a warning message indicating that the unconfirmed flight route is not confirmed is displayed on the display unit.

If the unconfirmed flight route is entirely included in the visually observable area, therefore, the unconfirmed flight route is confirmed to generate a confirmed flight route. If at least a part of the unconfirmed flight route is not included in the visually observable area, a warning message indicating that the unconfirmed flight route is not confirmed is displayed, and a confirmed flight route of the drone within an area in which the operator or the visual observer can visually observe the drone can be generated.

A computer-readable non-transitory recording medium according to another aspect of the present disclosure stores a program for controlling an apparatus including an input and a display. The program, when executed by a processor, causes the processor to implement a method including receiving, using the input, an unconfirmed flight route of a drone, displaying the unconfirmed flight route and a visually observable area on the display, the visually observable area including a first area, within which an observer located at a first position is able to visually observe the drone, the observer being an operator of the drone or a first visual observer, confirming, if the unconfirmed flight route is entirely included in the visually observable area, the unconfirmed flight route as a confirmed flight route, and displaying, on the display, if at least a part of the unconfirmed route is not included in the visually observable area, a warning message indicating that the unconfirmed flight route is not confirmed.

With this configuration, an unconfirmed flight route is received. A position of an operator of the drone or a first visual observer and a visually observable area based on the position of the operator or the first visual observer are displayed. If the unconfirmed flight route is entirely included in the visually observable area, the unconfirmed flight route is confirmed to generate a confirmed flight route. If at least a part of the unconfirmed route is not included in the visually observable area, a warning message indicating that the unconfirmed flight route is not confirmed is displayed on the display unit.

A confirmed flight route, therefore, can be generated with which the drone flies within an area in which the operator or the visual observer can visually observe the drone.

A terminal apparatus according to another aspect of the present disclosure includes one or more memories, and circuitry which, in operation, receives an unconfirmed flight route of a drone, transmits the unconfirmed flight route to a server, receives, from the server, a position of an operator of the drone or of a first visual observer, a visually observable area based on the position of the operator or of the first visual observer, and a warning message indicating, if at least a part of the unconfirmed flight route is not included in the visually observable area, that the unconfirmed flight route is not confirmed, and displays the visually observable area and the warning message.

With this configuration, an unconfirmed flight route is received. The unconfirmed flight route is transmitted. A position of an operator of the drone or a first visual observer, a visually observable area based on the position of the operator or the first visual observer, and a warning message indicating, if at least a part of the unconfirmed flight route is not included in the visually observable area, that the unconfirmed flight route is not confirmed are received. The visually observable area and the warning message are displayed.

Since, if at least a part of the unconfirmed flight route is not included in the visually observable area, a warning message indicating that the unconfirmed flight route is not confirmed is displayed, therefore, a confirmed flight route can be generated with which the drone flies within an area in which the operator or the visual observer can visually observe the drone.

Embodiments of the present disclosure will be described hereinafter with reference to the accompanying drawings. The following embodiments are specific examples of the present disclosure, and do not limit the technical scope of the present disclosure.

First Embodiment

A flight route generation system according to a first embodiment will be described. In the first embodiment, the flight route generation system when there are an operator who operates a drone and at least one VO will be described.

FIG. 1 is a diagram illustrating the configuration of a flight route generation system according to the first embodiment of the present disclosure. The flight route generation system illustrated in FIG. 1 includes a flight route generation apparatus 10, a drone 20, and a server 30.

The flight route generation apparatus 10 generates a flight route of the drone 20. The flight route generation apparatus 10 generates the flight route on the basis of an operation input by an operator 1. The flight route generation apparatus 10 is, for example, a smartphone, a tablet computer, or a personal computer. Alternatively, the flight route generation apparatus 10 may be, for example, a controller for remotely controlling the drone 20.

The drone 20 autonomously flies on the basis of a flight route generated by the flight route generation apparatus 10. The drone 20 includes propellers and moves forward, backward, leftward, rightward, upward, or downward by controlling speeds of the propellers. The drone 20 autonomously flies on the basis of a flight route generated by the flight route generation apparatus 10 while obtaining a current position thereof using a global positioning system (GPS).

While the drone 20 is flying, the operator 1 or a VO 2 visually observes the drone 20 as far as possible.

Although the drone 20 autonomously flies on the basis of a flight route in the present embodiment, the present disclosure is not particularly limited to this. The drone 20 need not autonomously fly but may be remotely controlled through a controller in such a way as to follow a flight route, instead. In this case, the flight route generation apparatus 10 may include the controller. If the drone 20 autonomously flies, the controller may transmit, to the drone 20, only an instruction to start a flight.

The server 30 is communicably connected to the flight route generation apparatus 10 through a network 40 and provides, for example, map information for the flight route generation apparatus 10. The network 40 is, for example, the Internet.

Figure 2:
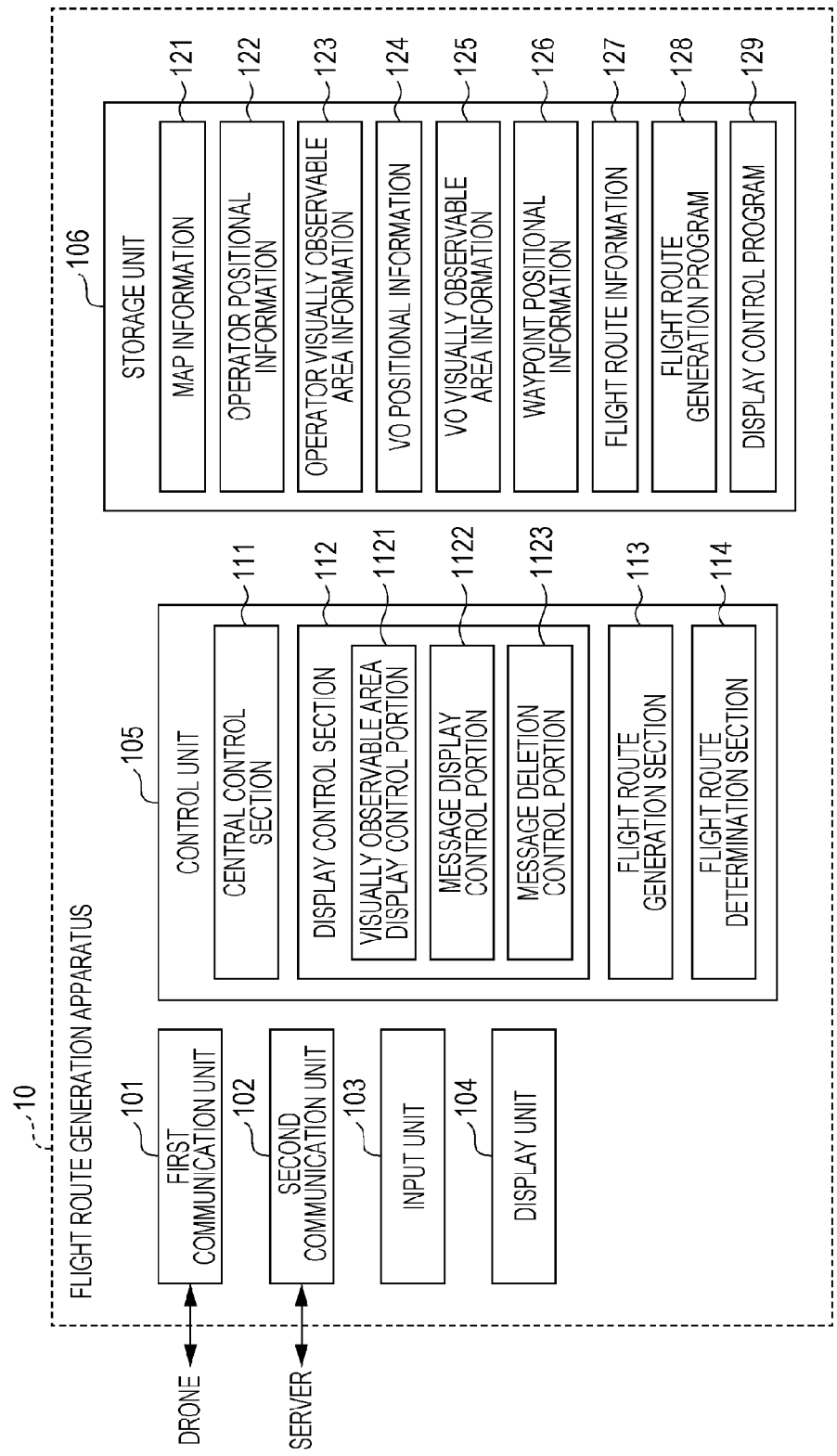
FIG. 2 is a block diagram illustrating the configuration of a flight route generation apparatus according to the first embodiment of the present disclosure.

FIG. 2 is a block diagram illustrating the configuration of the flight route generation apparatus 10 according to the first embodiment of the present disclosure. The flight route generation apparatus 10 illustrated in FIG. 2 includes a first communication unit 101, a second communication unit 102, an input unit 103, a display unit 104, a control unit 105, and a storage unit 106.

The first communication unit 101 wirelessly communicates with the drone 20. The first communication unit 101 transmits various pieces of information to the drone 20. The first communication unit 101 may be communicably connected to the drone 20 through the network 40.

The second communication unit 102 communicates with the server 30 through the network 40. The second communication unit 102 receives various pieces of information from the server 30. The second communication unit 102 receives map information 121 from the server 30.

The input unit 103 is, for example, a touch panel or an operation button and receives an input from the operator 1. The input unit 103 receives a flight route of the drone 20 input by the operator 1. The input unit 103 receives a flight start point, at which the drone 20 begins to fly, a waypoint, through which the drone 20 flies, and a destination point, at which the drone 20 arrives, input by the operator 1. The input unit 103 may receive a plurality of waypoints input by the operator 1.

The display unit 104 is, for example, a liquid crystal panel and displays various pieces of information.

The control unit 105 is, for example, a central processing unit (CPU) and controls the operation of the flight route generation apparatus 10. The control unit 105 includes a central control section 111, a display control section 112, a flight route generation section 113, and a flight route determination section 114.

The central control section 111 controls the operation of the components of the flight route generation apparatus 10. The flight route generation section 113 generates a flight route. The flight route generation section 113 generates a flight route, which is a combination of straight lines connecting a flight start point, a waypoint, and a destination point received by the input unit 103.

The display control section 112 controls the display unit 104. The display control section 112 includes a visually observable area display control portion 1121, a message display control portion 1122, and a message deletion control portion 1123.

The visually observable area display control portion 1121 displays, on the display unit 104, visually observable areas, in which the operator 1 and the VO 2, respectively, can visually observe the drone 20. The visually observable areas each have the shape of a circle whose center is a position of the operator 1 or the VO 2 and whose size is predetermined. The visually observable areas include an operator visually observable area, in which the operator 1 can visually observe the drone 20, and a VO visually observable area, in which the VO 2 can visually observe the drone 20.

The flight route determination section 114 determines whether a flight route is entirely included in the visually observable areas.

If a flight route is not entirely included in the visually observable areas, the message display control portion 1122 displays a warning image on the display unit 104. That is, if the flight route determination section 114 determines that a flight route is not entirely included in the visually observable areas, the message display control portion 1122 displays a warning message on the display unit 104. The warning message indicates that a flight start point, a waypoint, or a destination point input by the operator 1 is not entirely included in the visually observable areas. The message display control portion 1122 may display a warning mark instead of a warning message.

The input unit 103 receives a movement of a visually observable area input by the operator 1. The visually observable area display control portion 1121 moves a position at which a visually observable area is displayed in accordance with a movement of the visually observable area received by the input unit 103.

The message deletion control portion 1123 deletes a warning image if a visually observable area is moved and a flight route is entirely included in the visually observable areas. That is, if the flight route determination section 114 determines that a flight route is entirely included in the visually observable areas, the message deletion control portion 1123 deletes a warning message from the display unit 104. The message deletion control portion 1123 may delete a warning mark instead of a warning message.

The storage unit 106 is, for example, a semiconductor memory and stores various pieces of information. The storage unit 106 includes the map information 121, operator positional information 122, operator visually observable area information 123, VO positional information 124, VO visually observable area information 125, waypoint positional information 126, flight route information 127, a flight route generation program 128, and a display control program 129.

The map information 121 indicates a map. The operator positional information 122 indicates the position of the operator 1 on the map input by the operator 1 before a flight route is generated. The operator positional information 122 may be represented by coordinates on the map or may be represented by latitude and longitude.

The operator visually observable area information 123 indicates a position, a shape, and a size of an operator visually observable area on the map. The operator visually observable area information 123 may be represented by coordinates on the map or may be represented by latitude and longitude. The operator visually observable area is an area inside a circle whose center is indicated by the operator positional information 122. The storage unit 106, therefore, need not store the position of the operator visually observable area insofar as the storage unit 106 stores the operator positional information 122. That is, it is sufficient that the storage unit 106 stores information indicating that an operator visually observable area is an area inside a circle whose center is indicated by the operator positional information 122 and the radius of the circle. If the operator 1 does not visually observe the drone 20 that autonomously flies, the storage unit 106 need not store the operator positional information 122 and the operator visually observable area information 123.

The VO positional information 124 indicates the position of the VO 2 on the map input by the operator 1 when a flight route is generated. The VO positional information 124 may be represented by coordinates on the map or may be represented by latitude and longitude.

If the position of the VO 2 is predetermined, the operator 1 may input the position of the VO 2 before generating a flight route, and the storage unit 106 may store the position of the VO 2 as the VO positional information 124.

The VO visually observable area information 125 indicates a position, a shape, and a size of a VO visually observable area on the map. The VO visually observable area information 125 may be represented by coordinates on the map or may be represented by latitude and longitude. The VO visually observable area is an area inside a circle whose center is indicated by the VO positional information 124. The storage unit 106, therefore, need not store the position of the VO visually observable area insofar as the storage unit 106 stores the VO positional information 124. That is, it is sufficient that the storage unit 106 stores information indicating that a VO visually observable area is an area inside a circle whose center is indicated by the VO positional information 124 and the radius of the circle.

The waypoint positional information 126 indicates a position of a waypoint on the map input by the operator 1 when a flight route is generated. The waypoint positional information 126 may be represented by coordinates on the map or may be represented by latitude and longitude. The waypoint positional information 126 may include information indicating positions of a flight start point and a destination point, as well as information indicating the position of the waypoint.

The flight route information 127 relates to a flight route generated by the flight route generation section 113. The flight route information 127 indicates a route obtained by connecting a flight start point, at least one waypoint, and a destination point with straight lines.

The flight route generation program 128 is used for generating a flight route. The display control program 129 is used for controlling the display unit 104.

Figure 3:
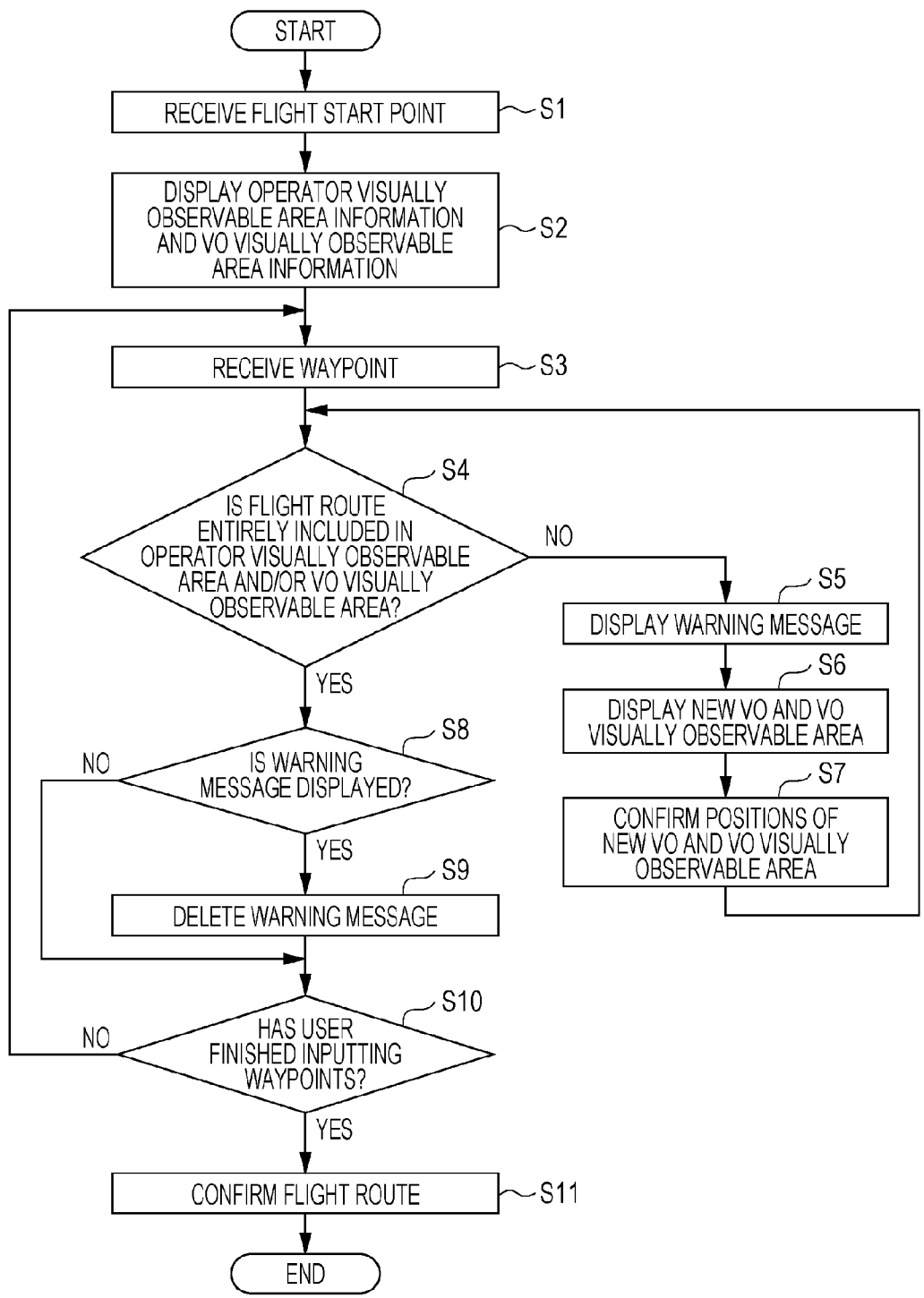
FIG. 3 is a flowchart illustrating the operation of the flight route generation apparatus according to the first embodiment of the present disclosure.

FIG. 3 is a flowchart illustrating the operation of the flight route generation apparatus 10 according to the first embodiment of the present disclosure.

The operator 1 executes the flight route generation program 128 using the flight route generation apparatus 10. After the flight route generation program 128 is executed, the display control section 112 displays, on the display unit 104, a map image around the position of the operator 1 indicated by the operator positional information 122 stored in the storage unit 106, as well as the position of the operator 1. If the storage unit 106 does not store the operator positional information 122, the display control section 112 displays, on the display unit 104, a screen asking the operator 1 to input the operator positional information 122, and the operator 1 inputs the position thereof using the input unit 103. The flight route generation section 113 stores the position of the operator 1 input using the input unit 103 in the storage unit 106 as the operator positional information 122. The operator positional information 122 displays, on the display unit 104, a map image around the position of the operator 1 indicated by the operator positional information 122, as well as the position of the operator 1.

Alternatively, if the storage unit 106 does not store the operator positional information 122, the operator positional information 122 may display a map image on the display unit 104, and the operator 1 may input the position thereof by specifying the position thereof on the map image using the input unit 103.

First, in step S1, the input unit 103 receives a flight start point input by the operator 1. The operator 1 sets a flight start point on the map image displayed on the display unit 104. The position of the operator 1 may be the flight start point, or another position may be the flight start point. The operator positional information 122 displays an icon indicating the input flight start point on the display unit 104. The flight route generation section 113 stores the flight start point in the storage unit 106 as the waypoint positional information 126.

Next, in step S2, the visually observable area display control portion 1121 displays, on the display unit 104, the operator visually observable area information 123 stored in the storage unit 106. The visually observable area display control portion 1121 displays an operator visually observable area whose center is the position of the operator 1. If the storage unit 106 stores the VO visually observable area information 125, the visually observable area display control portion 1121 displays the VO visually observable area information 125 on the display unit 104.

Next, in step S3, the display control section 112 displays, on the display unit 104, a screen asking the operator 1 to input a waypoint of a flight route. The operator 1 inputs a waypoint using the input unit 103. The operator 1 inputs a waypoint by specifying a point on the map image displayed on the display unit 104. The display control section 112 displays an icon indicating the input waypoint on the map image displayed on the display unit 104. The flight route generation section 113 stores the input waypoint in the storage unit 106 as the waypoint positional information 126.

Next, in step S4, the flight route determination section 114 determines whether a flight route connecting the flight start point and the waypoint is entirely included in the operator visually observable area and/or a VO visually observable area indicated by the operator visually observable area information 123 and the VO visually observable area information 125, respectively, stored in the storage unit 106.

If the flight route determination section 114 determines that the flight route is not entirely included in the operator visually observable area and/or the VO visually observable area (NO in step S4), the message display control portion 1122 displays, in step S5, a warning message on the display unit 104. The warning message may be superimposed upon the map image displayed on the display unit 104, instead.

Next, in step S6, the visually observable area display control portion 1121 displays a new VO and his/her VO visually observable area on the display unit 104 in order to add the new VO. Positions at which the new VO and his/her VO visually observable area are displayed on the display unit 104 may be anywhere on a display screen. Furthermore, the new VO and his/her VO visually observable area may be displayed near the flight route or may be displayed in such a way as to include a part of the flight route not included in the operator visually observable area or the VO visually observable area.

Next, in step S7, the input unit 103 receives confirmation, by the operator 1, of the positions of the new VO and his/her VO visually observable area on the map image displayed on the display unit 104. Since the input unit 103 is a touch panel, the operator 1 confirms the positions of the new VO and his/her VO visually observable area by touching the new VO and his/her VO visually observable area displayed on the display unit 104 with his/her finger, moving the new VO and his/her VO visually observable area to a part of the flight route not included in the operator visually observable area or the VO visually observable area, and lifting the finger from the touch panel, which is the input unit 103. If a plurality of new VOs and their VO visually observable areas are specified, the operator 1 confirms the new VOs and their VO visually observable areas through a plurality of operations.

The flight route generation section 113 stores all the VOs and their VO visually observable areas whose positions have been confirmed in the storage unit 106 as the VO positional information 124 and the VO visually observable area information 125, respectively.

Next, again in step S4, the flight route determination section 114 determines whether the flight route connecting the flight start point and the waypoint is entirely included in the operator visually observable area and/or the VO visually observable area.

If the flight route determination section 114 determines that the flight route is entirely included in the operator visually observable area and/or the VO visually observable area (YES in step S4), the process proceeds to step S8. In step S8, the message deletion control portion 1123 determines whether a warning message is displayed on the display unit 104. If determining that a warning message is displayed (YES in step S8), the message deletion control portion 1123 deletes, in step S9, the warning message displayed on the display unit 104.

On the other hand, if the message deletion control portion 1123 determines that a warning message is not displayed (NO in step S8), or if the message deletion control portion 1123 has deleted the warning message in step S9, the flight route generation section 113 determines in step S10 whether the operator 1 has finished inputting waypoints using the input unit 103. For example, an end button for finishing inputting waypoints is displayed on the display screen, and the operator 1 presses the end button using the input unit 103. If the end button is pressed, the flight route generation section 113 determines that the operator 1 has finished inputting waypoints. In this case, for example, a last waypoint is set as a destination point. Alternatively, if the operator 1 inputs a destination point using the input unit 103, the flight route generation section 113 may determine that the operator 1 has finished inputting waypoints.

If the flight route generation section 113 determines that the operator 1 has not finished inputting waypoints (NO in step S10), the process returns to step S3, and the input unit 103 receives another waypoint input by the operator 1.

On the other hand, if determining that the operator 1 has finished inputting waypoints (YES in step S10), the flight route generation section 113 confirms, in step S11, the flight route connecting the input flight start point and the input at least one waypoint and stores the flight route in the storage unit 106 as the flight route information 127. The flight route generation section 113 transmits the flight route information 127 to the drone 20 through the first communication unit 101. The drone 20 starts an autonomous flight on the basis of the received flight route information 127. The input unit 103 may receive a flight start time, at which the drone 20 starts an autonomous flight, from the operator 1, and the drone 20 may start the flight at the flight start time received from the flight route generation apparatus 10. Alternatively, the drone 20 may start the flight after receiving a flight start instruction from the controller.

When transmitting the flight route information 127 to the drone 20, the flight route generation section 113 may also transmit the operator positional information 122 and the VO positional information 124. After the operator 1 and the VO 2 are deployed on the basis of the operator positional information 122 and the VO positional information 124, the drone 20 may start an autonomous flight on the basis of the received flight route information 127.

Figure 4:
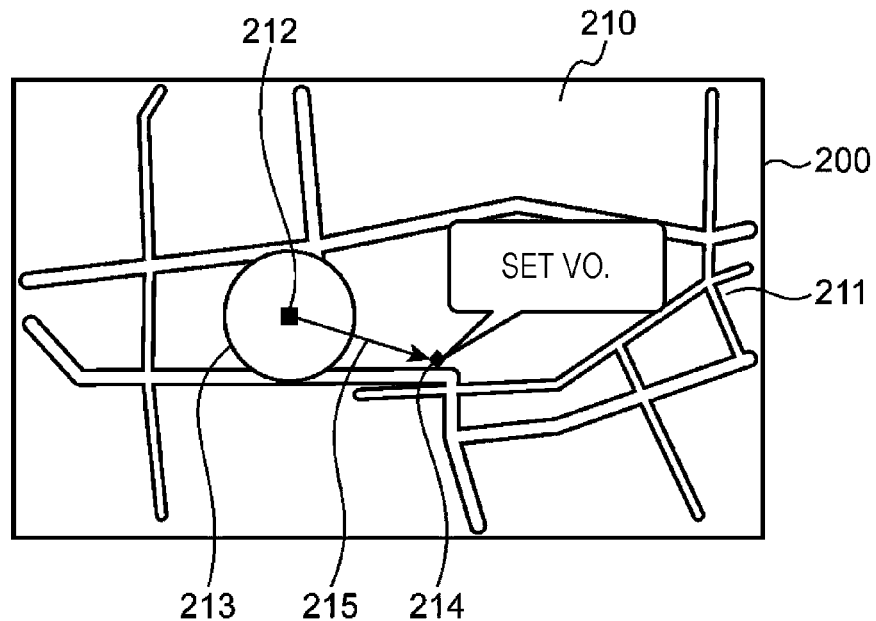
FIG. 4 is a diagram illustrating a display screen on which a warning message is displayed after a waypoint is input in the first embodiment of the present disclosure.

FIG. 4 is a diagram illustrating an example of a display screen on which a warning message is displayed after a waypoint is input in the first embodiment of the present disclosure. In FIG. 4, the flight start point is the position of the operator 1.

On a display screen 200 illustrated in FIG. 4, a map image 210, an icon 212 indicating the flight start point, an operator visually observable area 213, an icon 214 indicating a waypoint, and a flight route 215 connecting the flight start point and the waypoint are displayed.

Because a part of the flight route 215 is not included in the operator visually observable area 213, a warning message 211 is displayed. The warning message 211 indicates, for example, "Set VO". In FIG. 4, the warning message 211 is associated with the input waypoint. Alternatively, the warning message 211 may indicate that the waypoint is located outside the operator visually observable area 213.

Since the operator 1 is notified, when generating a flight route, that the flight route is not entirely included in an operator visually observable area, the operator 1 can understand that the drone 20 is not allowed to fly in current arrangement and the operator 1 needs to set a new VO.

Figure 5:
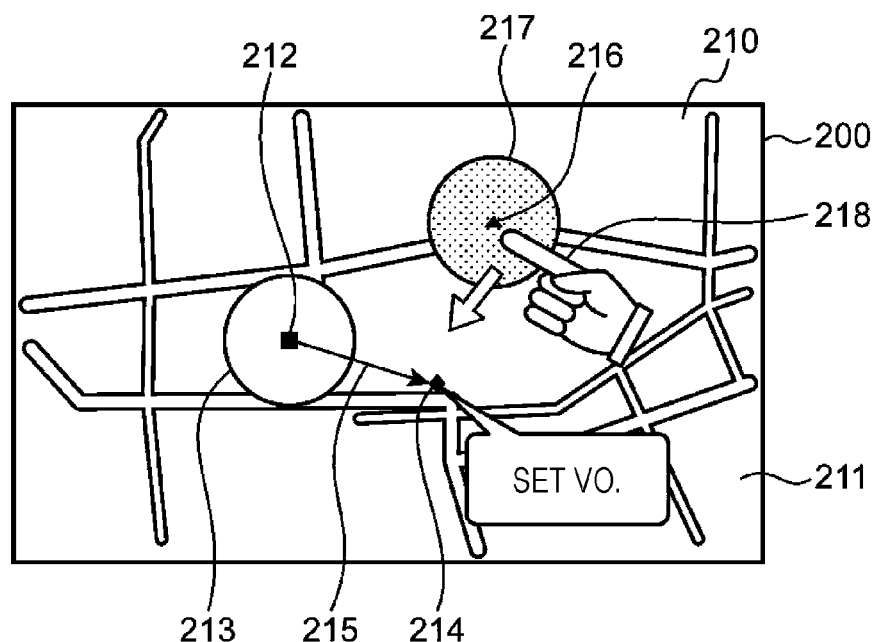
FIG. 5 is a diagram illustrating an example of a display screen displayed after positions of a new VO and his/her VO visually observable area are added in the first embodiment of the present disclosure.

FIG. 5 is a diagram illustrating an example of a display screen displayed after positions of a new VO and his/her VO visually observable area are added in the first embodiment of the present disclosure.

As illustrated in FIG. 5, after the warning message 211 is displayed, an icon 216 of the new VO and his/her VO visually observable area 217 are displayed on the display screen 200. The operator 1 touches the VO visually observable area 217 displayed on the display screen 200 with his/her finger 218 and moves the finger 218 to the flight route 215. As a result, the operator 1 can appropriately determine the position of the new VO while checking the VO visually observable area 217.

Figure 6:
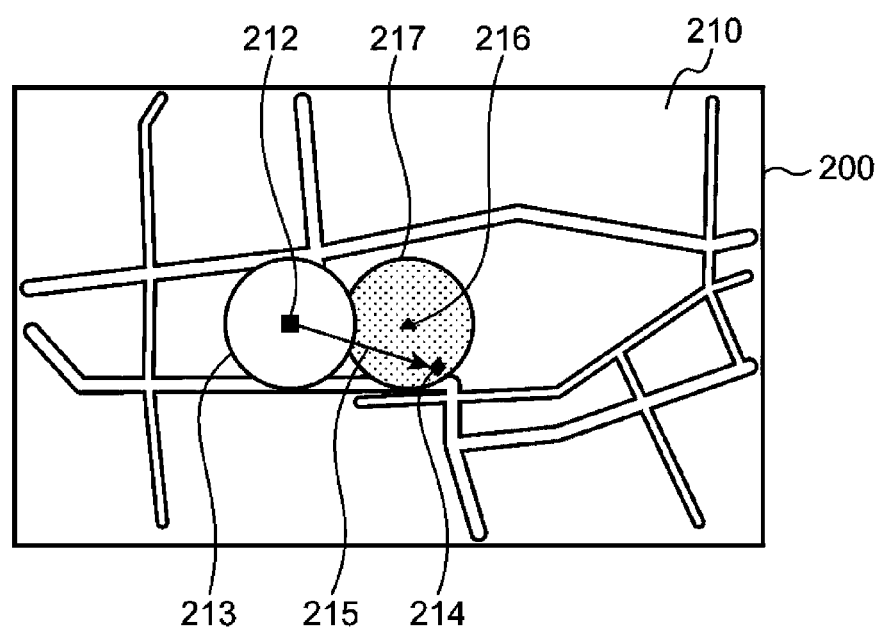
FIG. 6 is a diagram illustrating an example of a display screen displayed when a flight route is entirely included in an operator visually observable area and the VO visually observable area in the first embodiment of the present disclosure.

FIG. 6 is a diagram illustrating an example of a display screen displayed when the flight route 215 is entirely included in the operator visually observable area 213 and the VO visually observable area 217 in the first embodiment of the present disclosure.

As illustrated in FIG. 6, if the operator 1 sets the VO visually observable area 217 and the flight route 215 is entirely included in the operator visually observable area 213 and the VO visually observable area 217, the warning message 211 displayed on the display screen 200 is deleted.

As a result, the operator 1 can understand that the new VO who visually observes the drone 20 that flies the flight route 215 can be correctly set, that is, the operator 1 can easily set the position of the new VO.

Next, a flight route generation system according to a first modification of the first embodiment will be described.

In the first embodiment, the flight route determination section 114 determines whether a flight route is entirely included in an operator visually observable area and/or a VO visually observable area each time a waypoint is input. In the first modification of the first embodiment, on the other hand, the flight route determination section 114 determines whether a flight route is entirely included in an operator visually observable area and/or a VO visually observable area after the operator 1 finished inputting all waypoints.

The configuration of the flight route generation system and a flight route generation apparatus according to the first modification of the first embodiment are the same as that of the flight route generation system and the flight route generation apparatus 10 illustrated in FIGS. 1 and 2, respectively.

Figure 7:
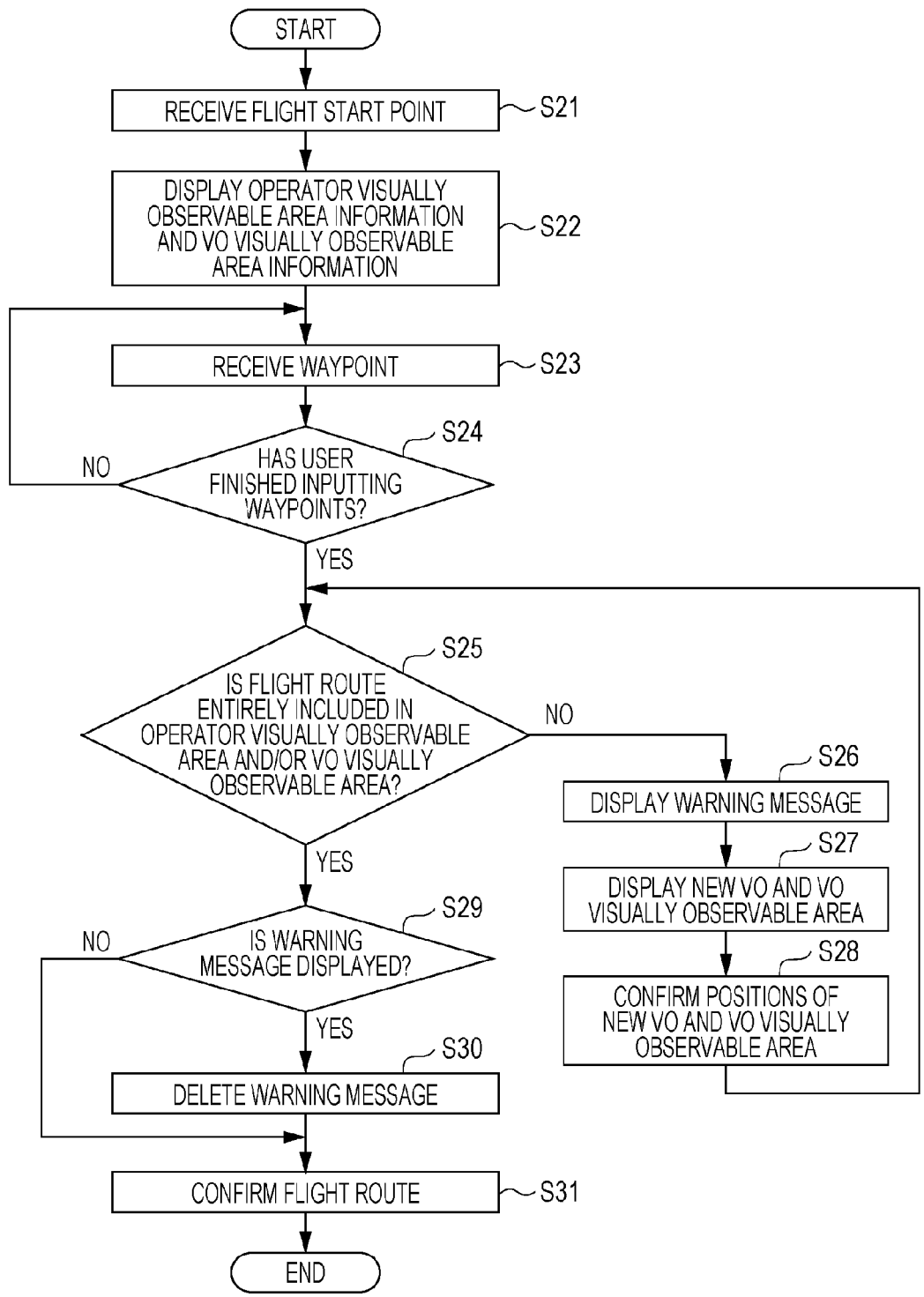
FIG. 7 is a flowchart illustrating the operation of the flight route generation apparatus according to a first modification of the first embodiment of the present disclosure.

FIG. 7 is a flowchart illustrating the operation of the flight route generation apparatus according to the first modification of the first embodiment of the present disclosure.

Processing in steps S21 to S23 is the same as that in steps S1 to S3, respectively, illustrated in FIG. 3, and description thereof is omitted.

Next, in step S24, the flight route generation section 113 determines whether the operator 1 has finished inputting waypoints using the input unit 103. For example, an end button for finishing inputting waypoints is displayed on the display screen, and the operator 1 presses the end button using the input unit 103. If the end button is pressed, the flight route generation section 113 determines that the operator 1 has finished inputting waypoints. In this case, for example, a last waypoint is set as a destination point. Alternatively, if the operator 1 inputs a destination point using the input unit 103, the flight route generation section 113 may determine that the operator 1 has finished inputting waypoints.

If the flight route generation section 113 determines that the operator 1 has not finished inputting waypoints (NO in step S24), the process returns to step S23, and the input unit 103 receives another waypoint input by the operator 1.

On the other hand, if determining that the operator 1 has finished inputting waypoints (YES in step S24), the flight route determination section 114 determines in step S25 whether a flight route connecting the flight start point and the waypoints is entirely included in the operator visually observable area and/or the VO visually observable area.

Processing in steps S25 to S30 is the same as that in steps S4 to S9, respectively, illustrated in FIG. 3, and description thereof is omitted.

If the message deletion control portion 1123 determines that a warning message is not displayed (NO in step S29), or if the message deletion control portion 1123 has deleted the warning message in step S30, the flight route generation section 113 confirms the flight route in step S31.

As described above, if a flight route is entirely included in visually observable areas (an operator visually observable area and/or a VO visually observable area), the flight route generation section 113 can confirm the flight route. If a flight route is not entirely included in any visually observable area (an operator visually observable area or a VO visually observable area), the flight route generation section 113 does not confirm the flight route.

Figure 8:
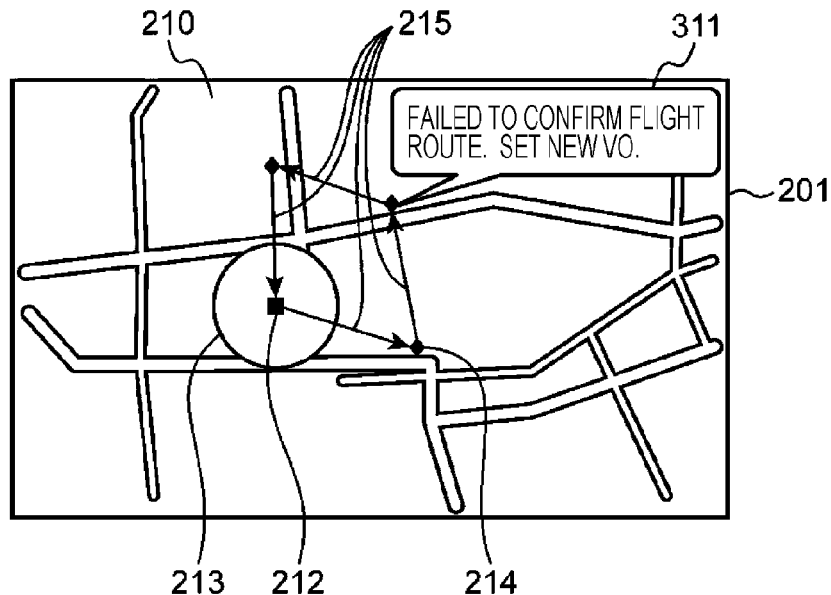
FIG. 8 is a diagram illustrating an example of a display screen displayed after the operator finishes inputting all waypoints in the first modification of the first embodiment of the present disclosure.

FIG. 8 is a diagram illustrating an example of a display screen displayed after the operator 1 finishes inputting all waypoints in the first modification of the first embodiment of the present disclosure. In FIG. 8, the flight start point is the position of the operator 1.

On a display screen 201 illustrated in FIG. 8, the map image 210, the icon 212 indicating the flight start point, the operator visually observable area 213, icons 214 indicating waypoints, and a flight route 215 connecting the flight start point and the waypoints are displayed. In FIG. 8, three waypoints are input. The operator 1 inputs the flight route 215 in which the drone 20 leaves the flight start point, flies over the three waypoints, and returns to the flight start point.

Because the flight route 215 is not entirely included in the operator visually observable area 213, a warning message 311 is displayed. The warning message 311 indicates, for example, "Failed to confirm flight route. Set new VO". As illustrated in FIG. 8, the warning message 311 is associated with one of the input waypoints. Alternatively, the warning message 311 may indicate that at least one of the waypoints of the flight route 215 is located outside the operator visually observable area 213.

As described above, the operator 1 inputs all waypoints and the message display control portion 1122 notifies, after a flight route is input, the operator 1 that the flight route is not entirely included in an operator visually observable area. The operator 1 can therefore understand that the operator 1 needs to set a new VO since the flight route is not confirmed and the drone 20 is not allowed to fly in current arrangement.

Figure 9:
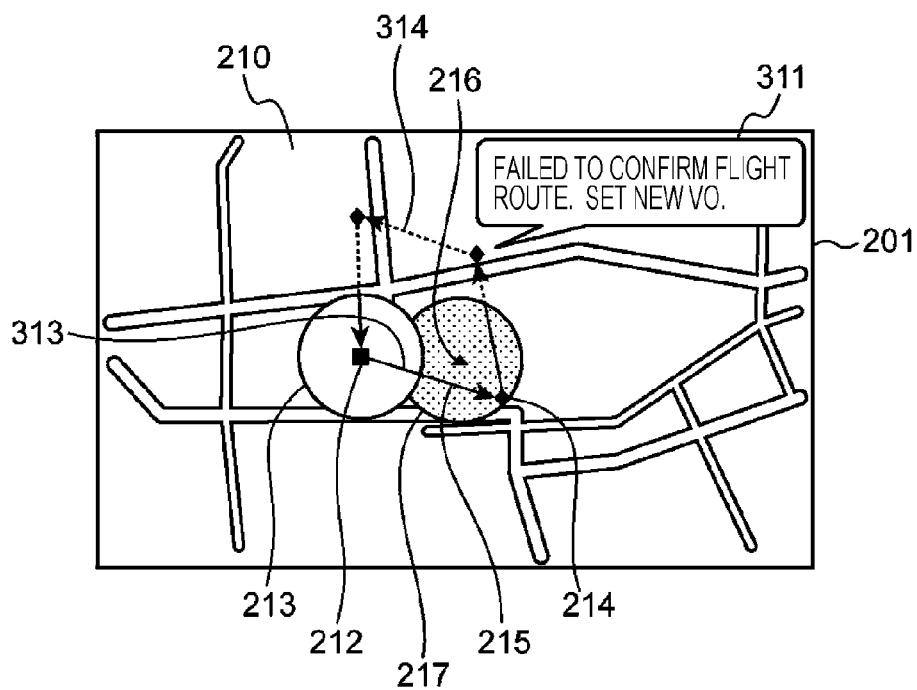
FIG. 9 is a diagram illustrating a display screen displayed after positions of a new VO and his/her VO visually observable area are added in the first modification of the first embodiment of the present disclosure.

FIG. 9 is a diagram illustrating an example of a display screen displayed after positions of a new VO and his/her VO visually observable area are added in the first modification of the first embodiment of the present disclosure.

As illustrated in FIG. 9, after the warning message 311 is displayed, an icon 216 of the new VO and his/her VO visually observable area are displayed on the display screen 201. The operator 1 touches the VO visually observable area 217 displayed on the display screen 201 with his/her finger and moves the finger to the flight route 215. As a result, the operator 1 can appropriately determine the position of the new VO while checking the VO visually observable area 217.

In addition, as illustrated in FIG. 9, the flight route 215 includes a first partial flight route 313 included in the visually observable areas (the operator visually observable area 213 and the VO visually observable area 217) and a second partial flight route 314 that is not included in any visually observable area. The display control section 112 displays the first partial flight route 313 and the second partial flight route 314 in different modes.

In FIG. 9, the first partial flight route 313 is indicated by solid lines, and the second partial flight route 314 is indicated by broken lines. The first partial flight route 313 and the second partial flight route 314 may thus be indicated by lines of different types. Alternatively, the first partial flight route 313 and the second partial flight route 314 may be indicated in different colors. The first partial flight route 313 and the second partial flight route 314 may be indicated in any modes insofar as the first partial flight route 313 and the second partial flight route 314 can be distinguished.

A flight route may be divided into a first partial flight route and a second partial flight route and displayed in different modes before a new VO is displayed, instead. More specifically, when a warning message is displayed after the operator 1 has finished inputting all waypoints, the first partial flight route and the second partial flight route may be displayed.

Figure 10:
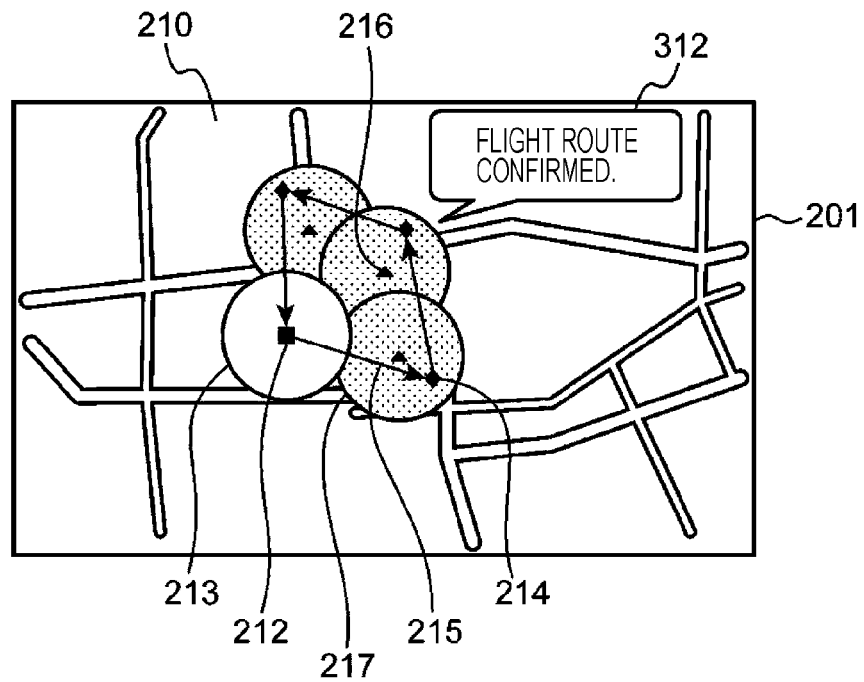
FIG. 10 is a diagram illustrating an example of a display screen displayed when a flight route is entirely included in the operator visually observable area and VO visually observable areas in the first modification of the first embodiment of the present disclosure.

FIG. 10 is a diagram illustrating an example of a display screen displayed when the flight route 215 is entirely included in the operator visually observable area 213 and VO visually observable areas 217 in the first modification of the first embodiment of the present disclosure.

As illustrated in FIG. 10, if the flight route 215 is entirely included in the operator visually observable area 213 and the VO visually observable areas 217 after the operator 1 sets VO visually observable areas 217, the warning message 311 displayed on the display screen 201 is deleted.

Furthermore, as illustrated in FIG. 10, the message display control portion 1122 may display a message 312 indicating that a flight route has been set, instead of the warning message 311. More specifically, the message 312 is, "Flight route confirmed".

In addition, as illustrated in FIG. 10, if the flight route 215 is not entirely included in one VO visually observable area 217, a plurality of VO visually observable areas 217 are displayed.

Next, a flight route generation system according to a second modification of the first embodiment will be described.

Although only an operator visually observable area is displayed when a flight start point is input in FIGS. 4, 5, and 6 in the first embodiment, a position of a VO might be predetermined. In the second modification of the first embodiment, therefore, if a position of a VO is predetermined and a flight start point is input, not only an operator visually observable area but also a VO visually observable area of the VO whose position is predetermined is displayed.

The configuration of a flight route generation system and a flight route generation apparatus according to the second modification of the first embodiment is the same as that of the flight route generation system and the flight route generation apparatus 10 illustrated in FIGS. 1 and 2.

Figure 11:
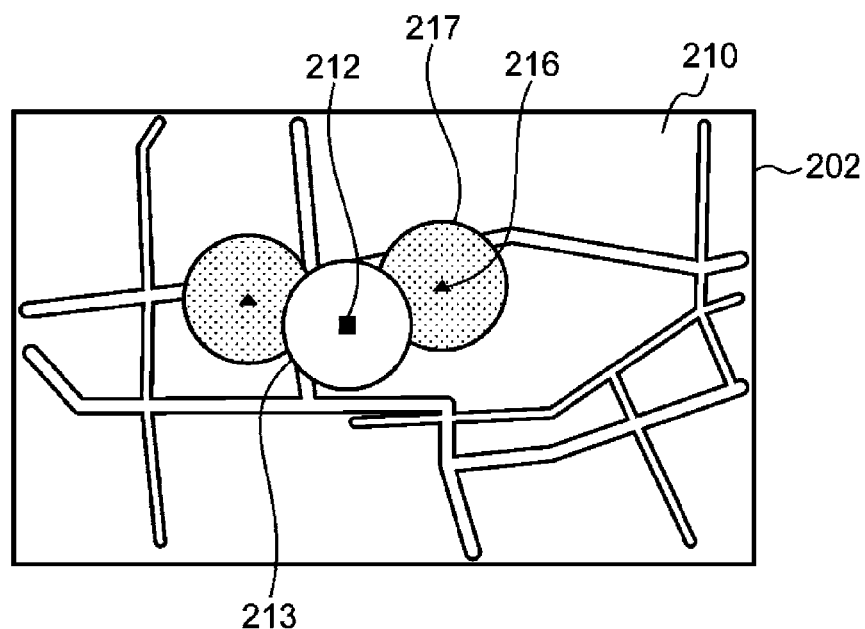
FIG. 11 is a diagram illustrating an example of a display screen displayed after a flight start point is input in a second modification of the first embodiment of the present disclosure.

FIG. 11 is a diagram illustrating an example of a display screen displayed after a flight start point is input in the second modification of the first embodiment of the present disclosure. In FIG. 11, the flight start point is the position of the operator 1.

On a display screen 202 illustrated in FIG. 11, the map image 210, the icon 212 indicating the flight start point, the operator visually observable area 213, icons 216 indicating positions of VOs, and VO visually observable areas 217 are displayed. Since positions of the two VO are predetermined in the example illustrated in FIG. 11, the two VO visually observable areas 217 are displayed.

If the positions of the VOs are predetermined and the operator visually observable area 213 and the two VO visually observable areas 217 overlap, an area of a logical sum of the operator visually observable area 213 and the two VO visually observable areas 217 is displayed. As a result, the operator 1 can generate a flight route in consideration of not only the position thereof but also the VO visually observable areas 217 of the two VOs who have already been set.

Next, a flight route generation system according to a third modification of the first embodiment will be described.

There may be a VO whose position is not fixed and his/her VO visually observable area as well as a VO whose position is predetermined and his/her VO visually observable area. The visually observable area display control portion 1121, therefore, displays a VO visually observable area of a VO whose position is not fixed and a VO visually observable area of a VO whose position is fixed in a distinguishable manner.

Figure 12:
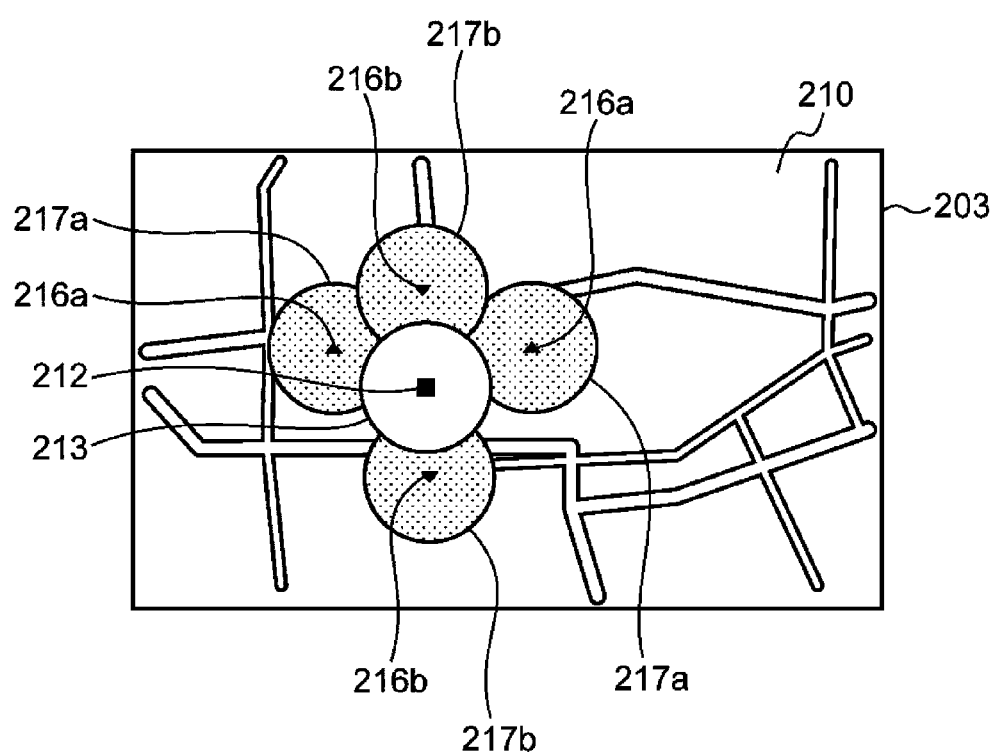
FIG. 12 is a diagram illustrating an example of a display screen displayed after a flight start point is input in a third modification of the first embodiment of the present disclosure.

FIG. 12 is a diagram illustrating an example of a display screen displayed after a flight start point is input in the third modification of the first embodiment of the present disclosure. In FIG. 12, the flight start point is the position of the operator 1.

On a display screen 203 illustrated in FIG. 12, the map image 210, the icon 212 indicating the flight start point, the operator visually observable area 213, icons 216a indicating VOs whose positions are not fixed, VO visually observable areas 217a of the VOs whose positions are not fixed, icons 216b indicating VOs whose positions are fixed, and VO visually observable areas 217b of the VOs whose positions are fixed. Since the positions of the four VOs are predetermined in the example illustrated in FIG. 12, the four VO visually observable areas 217a and 217b are displayed. Among the four VO visually observable areas 217a and 217b, the positions of the VOs of the two VO visually observable areas 217a are not fixed, and the positions of the VOs of the two VO visually observable areas 217b are fixed.

The visually observable areas include moving visually observable areas (VO visually observable areas 217a) in which the positions of the corresponding VOs are not fixed and fixed visually observable areas (VO visually observable areas 217b) in which the positions of the corresponding VOs are fixed.

The visually observable area display control portion 1121 displays the moving visually observable areas (VO visually observable areas 217a) and the fixed visually observable areas (VO visually observable areas 217b) in a distinguishable manner. For example, the VO visually observable areas 217a and the VO visually observable areas 217b are displayed in different colors.

If a flight route is not entirely included in the operator visually observable area 213, the moving visually observable areas (VO visually observable areas 217a), and/or the fixed visually observable areas (VO visually observable areas 217b), the message display control portion 1122 displays a warning message. The input unit 103 receives movements of the moving visually observable areas (VO visually observable areas 217a) input by the operator 1. If the flight route is entirely included in the operator visually observable area 213, the moving visually observable areas (VO visually observable areas 217a), and/or the fixed visually observable areas (VO visually observable areas 217b) after the operator 1 moves the moving visually observable areas (VO visually observable areas 217a), the message deletion control portion 1123 deletes the displayed warning message.

Second Embodiment

In the first embodiment, positions of an operator and a VO do not change while the drone 20 is flying, that is, the positions of the operator and the VO remain the same relative to a flight route. In a second embodiment, on the other hand, positions of an operator and a VO can be changed while the drone 20 is flying. A flight route of the drone 20 is confirmed by changing the position(s) of the operator and/or the VO relative to the flight route.

Figure 13:
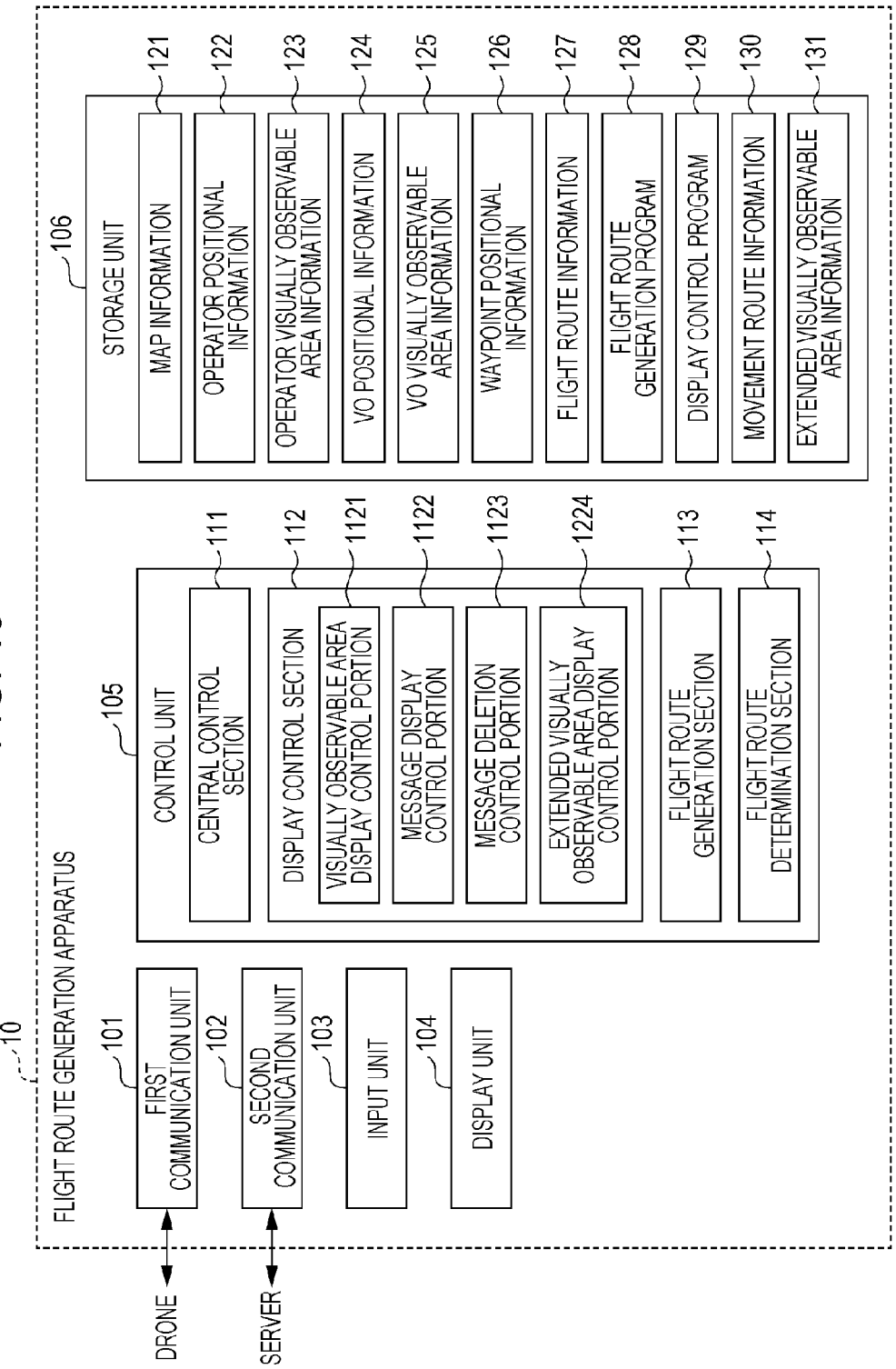
FIG. 13 is a block diagram illustrating the configuration of a flight route generation apparatus according to a second embodiment of the present disclosure.

FIG. 13 is a block diagram illustrating the configuration of a flight route generation apparatus according to the second embodiment of the present disclosure. A flight route generation apparatus 10 illustrated in FIG. 13 includes the first communication unit 101, the second communication unit 102, the input unit 103, the display unit 104, the control unit 105, and the storage unit 106. The same components as those of the flight route generation apparatus 10 according to the first embodiment are given the same reference numerals, and description thereof is omitted.

The input unit 103 receives a change in the position of the operator or the VO input by the operator. A movement route of the operator or the VO from an original position to a new position may be determined by specifying the new position or by simply specifying the movement route.

The control unit 105 includes the central control section 111, the display control section 112, the flight route generation section 113, and the flight route determination section 114.

The display control section 112 includes the visually observable area display control portion 1121, the message display control portion 1122, the message deletion control portion 1123, and an extended visually observable area display control portion 1124.

The extended visually observable area display control portion 1124 displays a track of a visually observable area according to the movement route of the operator or the VO as an extended visually observable area.

The message deletion control portion 1123 deletes a displayed warning message if a flight route is entirely included in an extended visually observable area.

The storage unit 106 includes the map information 121, the operator positional information 122, the operator visually observable area information 123, the VO positional information 124, the VO visually observable area information 125, the waypoint positional information 126, the flight route information 127, the flight route generation program 128, the display control program 129, movement route information 130, and extended visually observable area information 131.

The movement route information 130 relates to a movement route of the operator or the VO on a map. The movement route is input using the input unit 103.

The extended visually observable area information 131 indicates a position, a shape, and a size of an extended visually observable area on the map. The extended visually observable area information 131 may be represented by coordinates on the map or may be represented by latitude and longitude. The extended visually observable area is a track of an area inside a circle whose center is the position of the operator or the VO according to a movement route of the operator or the VO. The storage unit 106, therefore, need not store a position of an extended visually observable area insofar as the storage unit 106 stores a movement route of the operator or the VO. That is, it is sufficient that the storage unit 106 stores information indicating that an extended visually observable area is a track of an area inside a circle whose center is the position of the operator or the VO according to a movement route of the operator or the VO and the radius of the circle.

Figure 14:
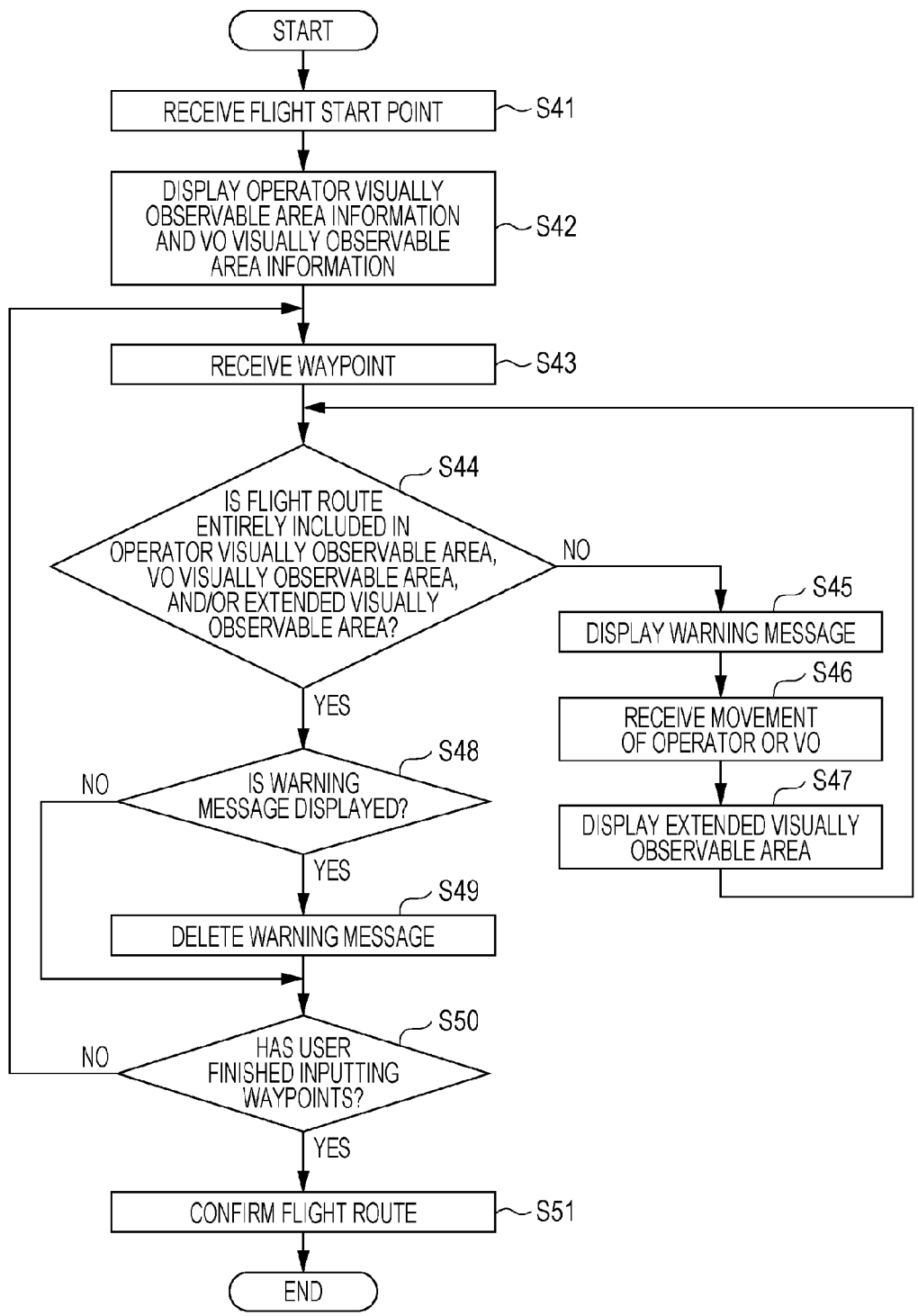
FIG. 14 is a flowchart illustrating the operation of the flight route generation apparatus according to the second embodiment of the present disclosure.

FIG. 14 is a flowchart illustrating the operation of the flight route generation apparatus 10 according to the second embodiment of the present disclosure.

Processing in steps S41 to S43 is the same as that in steps S1 to S3, respectively, illustrated in FIG. 3, and description thereof is omitted.

Next, in step S44, the flight route determination section 114 determines whether a flight route connecting a flight start point and a waypoint is entirely included in an operator visually observable area, a VO visually observable area, and/or an extended visually observable area indicated by the operator visually observable area information 123, the VO visually observable area information 125, and the extended visually observable area information 131, respectively, stored in the storage unit 106.

If the flight route is not entirely included in the operator visually observable area, the VO visually observable area, and/or the extended visually observable area (NO in step S44), the message display control portion 1122 displays, in step S45, a warning message on the display unit 104.

Next, in step S46, the input unit 103 receives a movement of the operator or the VO input by the operator. A movement route of the operator or the VO from an original position to a new position may be determined by specifying the new position or by simply specifying the movement route. Since the input unit 103 is a touch panel, if desiring to specify a movement route, the operator touches the position thereof or the position of the VO displayed on the display unit 104 with his\her finger and moves the finger to a desired position. The operator then lifts the finger from the touch panel, which is the input unit 103, to confirm the movement route.

Next, in step S47, the extended visually observable area display control portion 1124 displays a track of the operator visually observable area or the VO visually observable area according to the movement route of the operator or the VO as an extended visually observable area. Furthermore, the displayed extended visually observable area is stored in the storage unit 106 as the extended visually observable area information 131. The process returns to step S44, and the flight route determination section 114 determines whether the flight route connecting the flight start point and the waypoint is entirely included in the operator visually observable area, the VO visually observable area, and/or the extended visually observable area.

If the flight route is entirely included in the operator visually observable area, the VO visually observable area, and/or the extended visually observable area (YES in step S44), the message deletion control portion 1123 determines, in step S48, whether a warning message is displayed on the display unit 104.

Processing in steps S48 to S51 is the same as that in steps S8 to S11, respectively, illustrated in FIG. 3, and description thereof is omitted.

Figure 15:
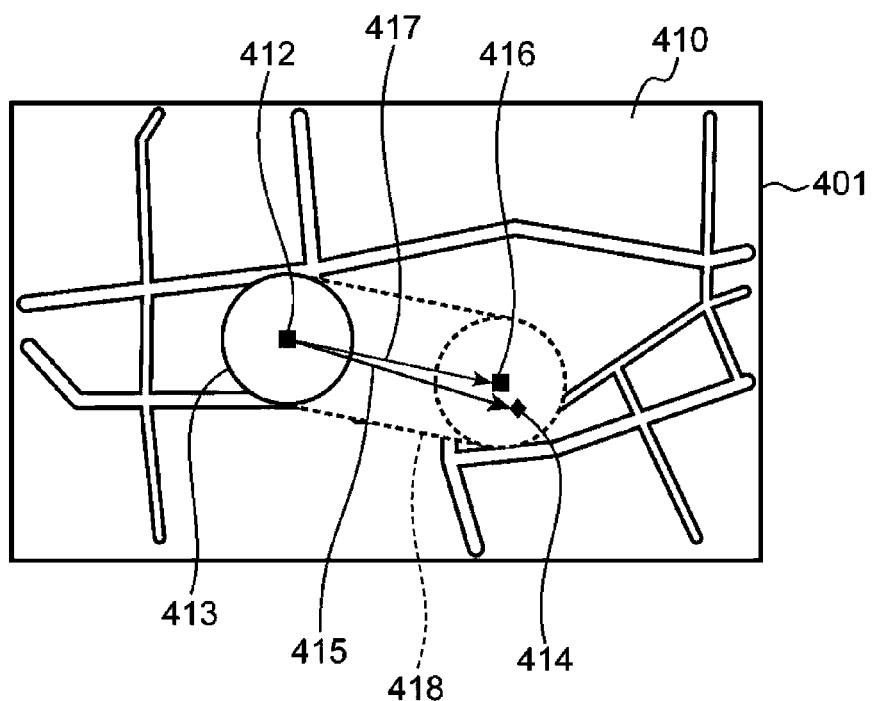
FIG. 15 is a diagram illustrating an example of a display screen displayed when a flight route is entirely included in an operator visually observable area, a VO visually observable area, and/or an extended visually observable area indicated by operator visually observable area information, VO visually observable area information, and extended visually observable area information, respectively, in the second embodiment of the present disclosure.

FIG. 15 is a diagram illustrating an example of a display screen displayed when a flight route is entirely included in an operator visually observable area, a VO visually observable area, and/or an extended visually observable area indicated by the operator visually observable area information 123, the VO visually observable area information 125, and the extended visually observable area information 131, respectively, in the second embodiment of the present disclosure. In FIG. 15, the flight start point is the position of the operator.

On a display screen 401 illustrated in FIG. 15, a map image 410, an icon 412 indicating the flight start point, an operator visually observable area 413, an icon 414 indicating a waypoint, a flight route 415 connecting the flight start point and the waypoint, an icon 416 indicating a new position of the operator, a movement route 417 of the operator, and an extended visually observable area 418 are displayed.

Because the flight route 415 is not entirely included in the operator visually observable area 413 when the flight start point and the waypoint are input, a warning message (not illustrated) is displayed.

The operator touches the icon 412 displayed on the display screen 401 with his/her finger and moves the finger to a desired position. As a result, a position of the icon 412 changes to a position of the icon 416, and the movement route 417 of the operator is displayed. A track of the operator visually observable area 413 according to the movement route 417 of the operator is then displayed as the extended visually observable area 418.

As illustrated in FIG. 15, if, after the operator visually observable area 413 is moved, the flight route 415 is entirely included in the operator visually observable area 413 and the extended visually observable area 418, the warning message displayed on the display screen 401 is deleted.

Although the position of the operator is moved and a track of an operator visually observable area according to a movement route of the operator is displayed as an extended visually observable area in the second embodiment, the present disclosure is not particularly limited to this. The position of the VO may be moved, and a track of a VO visually observable area according to a movement route of the VO may be displayed as an extended visually observable area, instead. Alternatively, the positions of the operator and the VO may be moved, and tracks of an operator visually observable area and a VO visually observable area according to movement routes of the operator and the VO may be displayed as extended visually observable areas.

Next, a flight route generation system according to a modification of the second embodiment will be described.

In the second embodiment, whether a flight route is entirely included in an operator visually observable area, a VO visually observable area, and/or an extended visually observable area is determined each time a waypoint is input, and if the flight route is not entirely included in the operator visually observable area, the VO visually observable area, and/or the extended visually observable area, a movement route of the operator or the VO is input. In the modification of the second embodiment, on the other hand, a movement route of the operator or the VO is input after all waypoints are input, and then whether a flight route is entirely included in an extended visually observable area is determined.

The configuration of the flight route generation system and a flight route generation apparatus according to the modification of the second embodiment is the same as that of the flight route generation system and the flight route generation apparatus 10 illustrated in FIGS. 1 and 13, respectively.

Figure 16:
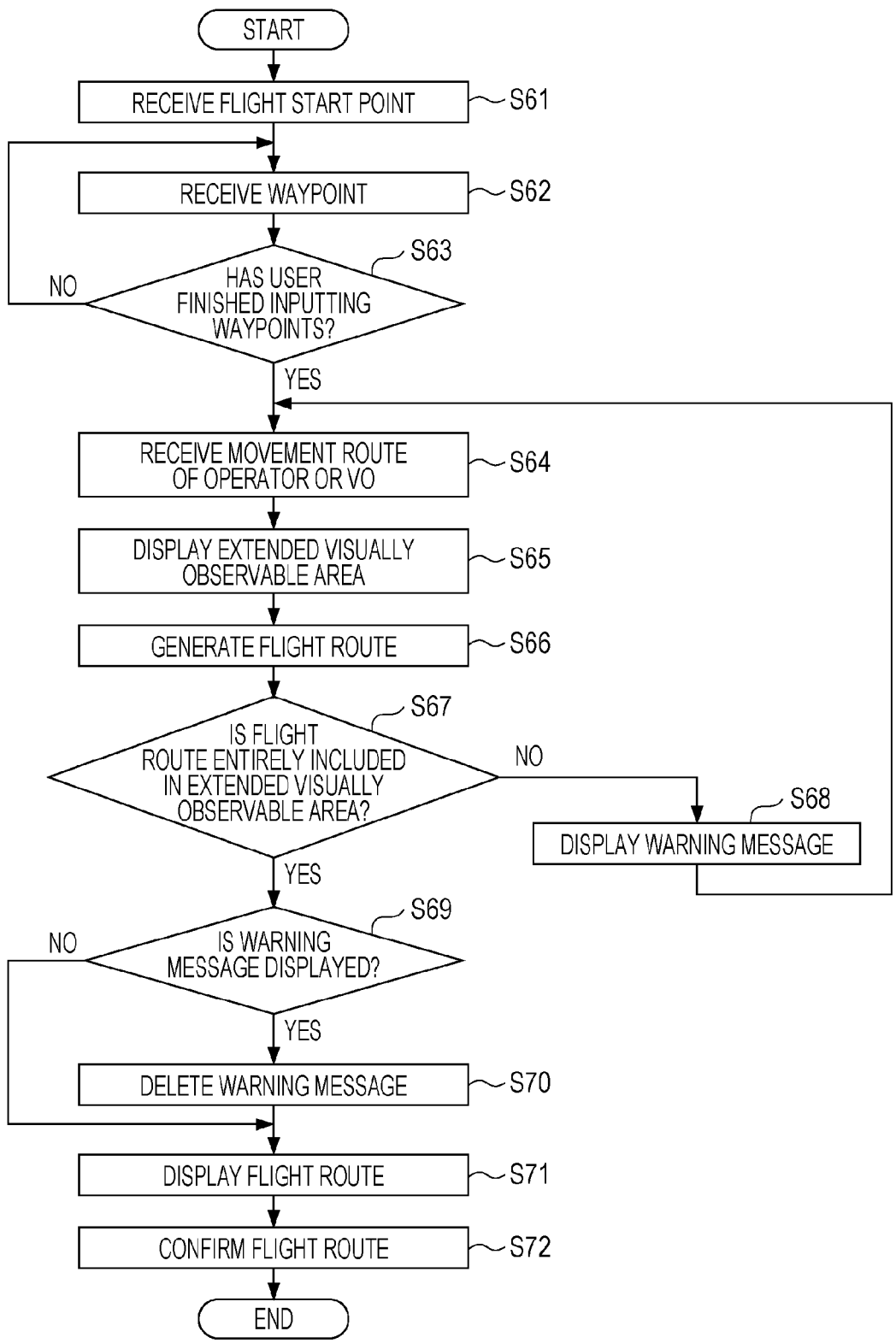
FIG. 16 is a flowchart illustrating the operation of the flight route generation apparatus according to a modification of the second embodiment of the present disclosure.

FIG. 16 is a flowchart illustrating the operation of the flight route generation apparatus according to the modification of the second embodiment of the present disclosure.

First, in step S61, the input unit 103 receives a flight start point input by the operator. The operator sets the flight start point on a map image displayed on the display unit 104. The display control section 112 displays an icon indicating the input flight start point on the display unit 104.

Next, in step S62, the display control section 112 displays, on the display unit 104, a screen asking the operator to input a waypoint. The operator inputs a waypoint using the input unit 103. The operator inputs a waypoint by specifying a point on the map image displayed on the display unit 104. The display control section 112 displays an icon indicating the input waypoint on the display unit 104.

Next, in step S63, the flight route generation section 113 determines whether the operator has finished inputting waypoints using the input unit 103. For example, an end button for finishing inputting waypoints is displayed on a display screen, and the operator presses the end button using the input unit 103. If the end button is pressed, the flight route generation section 113 determines that the operator has finished inputting waypoints. In this case, for example, a last waypoint is set as a destination point. Alternatively, if the operator inputs a destination point using the input unit 103, the flight route generation section 113 may determine that the operator has finished inputting waypoints.

Next, in step S64, the input unit 103 receives a movement route of the operator or the VO input by the operator. Since the input unit 103 is a touch panel, the operator touches a position thereof or a position of the VO displayed on the display unit 104 with his/her finger and moves the finger to a desired position. The operator then lifts the finger from the touch panel, which is the input unit 103, to confirm the movement route. The display control section 112 moves the displayed position of the operator or the VO in accordance with the movement of the operator's finger. It is desirable for the display unit 104 to display the input flight route. In this case, the operator can input a movement route while checking the flight route displayed on the display unit 104.

Next, in step S65, the extended visually observable area display control portion 1124 displays a track of an operator visually observable area or a VO visually observable area according to the movement route of the operator or the VO as an extended visually observable area.

Next, in step S66, the flight route generation section 113 generates a flight route connecting the flight start point and the waypoints entirely included in the extended visually observable area. That is, the flight route generation section 113 generates a flight route including a first partial flight route that runs parallel to the movement route and second partial flight routes connecting the first partial flight route and the waypoints.

Next, in step S67, the flight route determination section 114 determines whether the flight route connecting the flight start point and the waypoints is entirely included in the extended visually observable area.

If the flight route determination section 114 determines that the flight route is not entirely included in the extended visually observable area (NO in step S67), the message display control portion 1122, in step S68, displays, on the display unit 104, a warning message asking the operator to input a movement route again. The process returns to step S64, and the input unit 103 again receives a movement route of the operator or the VO input by the operator. The operator changes the movement route thereof or the movement route of the VO such that the flight route is entirely included in the extended visually observable area.

If the flight route determination section 114 determines that the flight route is entirely included in the extended visually observable area (YES in step S67), the process proceeds to step S69. In step S69, the message deletion control portion 1123 determines whether a warning message is displayed on the display unit 104. If the message deletion control portion 1123 determines that a warning message is displayed (YES in step S69), the process proceeds to step S70. In step S70, the message deletion control portion 1123 deletes the warning message displayed on the display unit 104.

On the other hand, if the message deletion control portion 1123 determines that a warning message is not displayed (NO in step S69), or if the message deletion control portion 1123 has deleted the warning message in step S70, the flight route generation section 113 displays, in step S71, the generated flight route on the display unit 104.

Next, in step S72, the flight route generation section 113 confirms the input flight route connecting the flight start point and the at least one waypoint and stores the flight route in the storage unit 106 as the flight route information 127. The flight route generation section 113 transmits the flight route information 127 to the drone 20 through the first communication unit 101. The drone 20 starts an autonomous flight on the basis of the received flight route information 127. The operator may input a flight start time, at which the drone 20 starts an autonomous flight, using the input unit 103, and the drone 20 may start the flight at the flight start time received from the flight route generation apparatus 10. Alternatively, the drone 20 may start the flight after receiving a flight start instruction from the controller.

Figure 17:
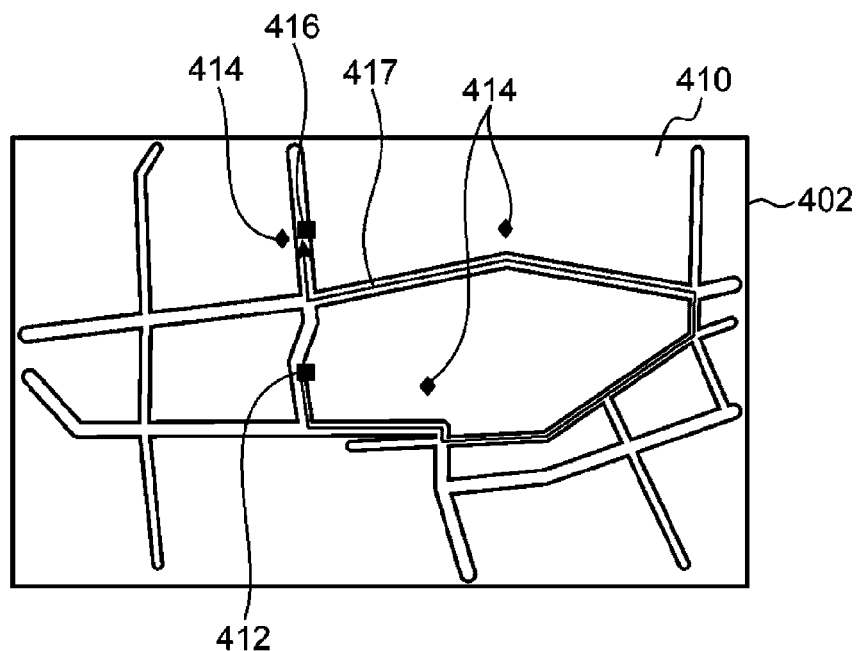
FIG. 17 is a diagram illustrating an example of a display screen displayed after waypoints and a movement route are input in the modification of the second embodiment of the present disclosure.

FIG. 17 is a diagram illustrating an example of a display screen displayed after waypoints and a movement route are input in the modification of the second embodiment of the present disclosure. In FIG. 17, the flight start point is the position of the operator.

On a display screen 402 illustrated in FIG. 17, the map image 410, an icon 412 indicating the flight start point, icons 414 indicating the waypoints, an icon 416 indicating a new position of the operator, and a movement route 417 of the operator are displayed.

After inputting the flight start point and the waypoints, the operator touches the icon 412 displayed on the display screen 402 with his/her finger and moves the finger to a desired position. As a result, a position of the icon 412 changes to a position of the icon 416, and the movement route 417 of the operator is displayed.

Figure 18:
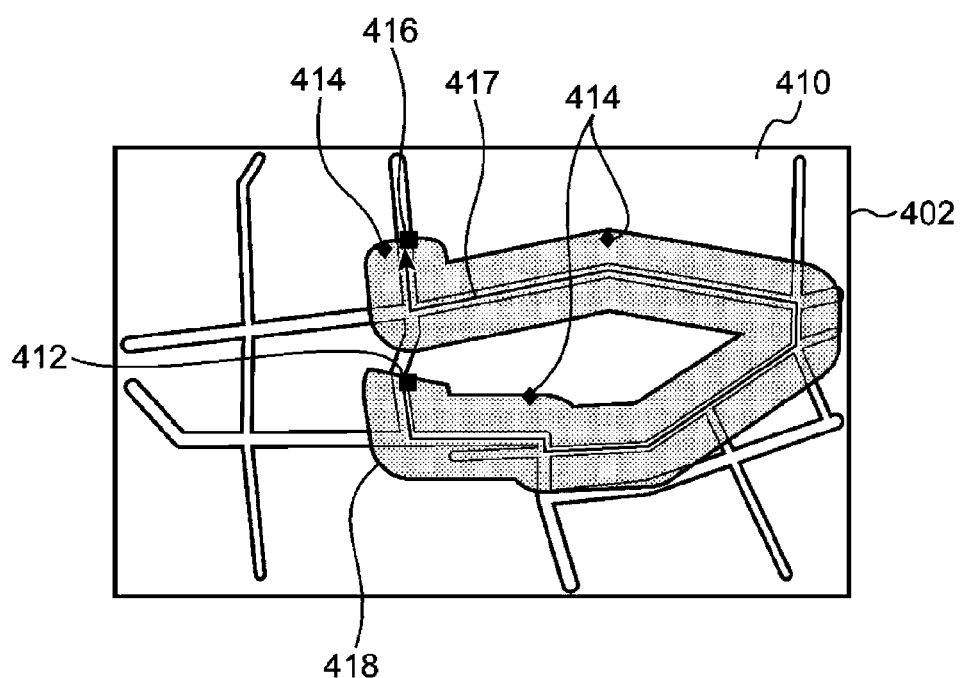
FIG. 18 is a diagram illustrating an example of a display screen on which an extended visually observable area is displayed in the modification of the second embodiment of the present disclosure.

FIG. 18 is a diagram illustrating an example of a display screen on which an extended visually observable area is displayed in the modification of the second embodiment of the present disclosure.

After the operator inputs the movement route 417 thereof, a track of the operator visually observable area 413 according to the movement route 417 is displayed as the extended visually observable area 418. If a flight route is not entirely included in the extended visually observable area 418 at this time, a warning message is displayed on the display screen 402. Since the flight route is entirely included in the extended visually observable area 418 in the example illustrated in FIG. 18, a warning message is not displayed.

Figure 19:
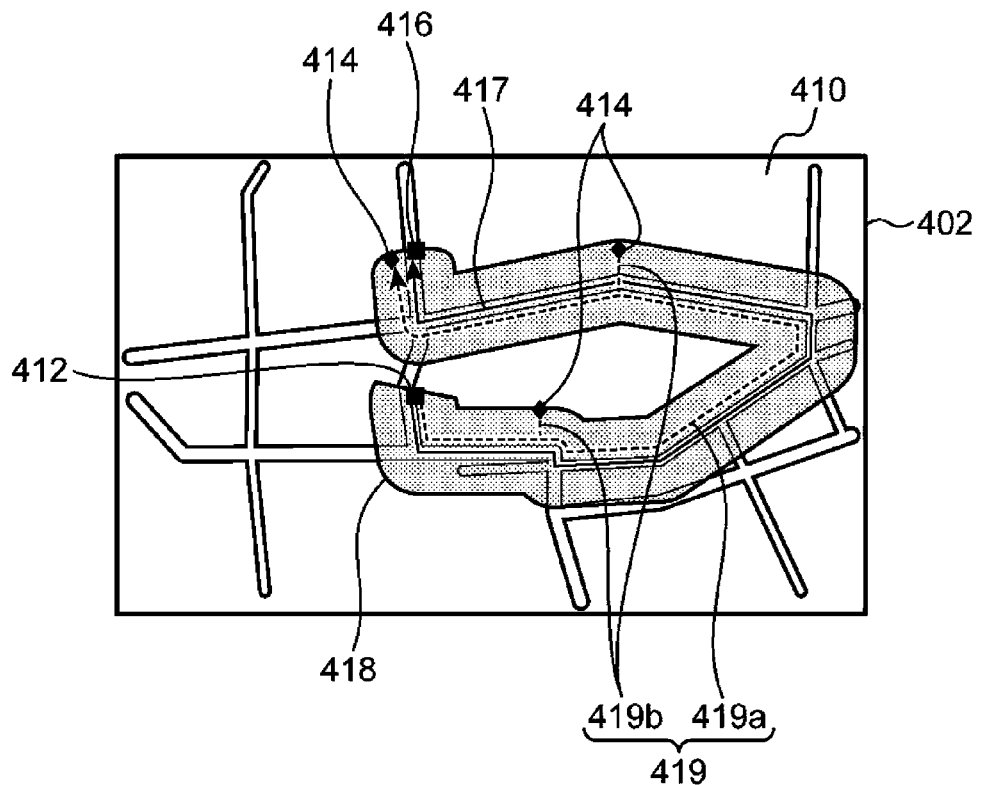
FIG. 19 is a diagram illustrating an example of a display screen on which a flight route is displayed in the modification of the second embodiment of the present disclosure.

FIG. 19 is a diagram illustrating an example of a display screen on which a flight route is displayed in the modification of the second embodiment of the present disclosure.

If the flight route is entirely included in the extended visually observable area 418, a flight route 419 is displayed on the display screen 402. The flight route 419 includes a first partial flight route 419a that runs parallel to the movement route 417 and second partial flight routes 419b connecting the first partial flight route 419a and the waypoints.

Alternatively, the flight route generation section 113 may generate a flight route 419 that is entirely included in the extended visually observable area 418 and that connects the waypoints in a shortest distance.

Alternatively, the flight route generation section 113 may generate a flight route 419 connecting the flight start point and the waypoints with straight lines. In this case, the flight route determination section 114 determines whether the flight route 419 connecting the flight start point and the waypoints is entirely included in the extended visually observable area 418. If the flight route determination section 114 determines that the flight route 419 is not entirely included in the extended visually observable area 418, the message display control portion 1122 displays, on the display unit 104, a warning message indicating that the flight route 419 is not entirely included in the extended visually observable area 418. Alternatively, the message display control portion 1122 may display a warning message asking the operator to input a movement route again or a warning message asking the operator to correct the flight route 419.

Although if the flight route determination section 114 determines that a flight route is not entirely included in an extended visually observable area, the message display control portion 1122 displays, on the display screen, a warning message asking the operator to input a movement route again in the modification of the second embodiment, the present disclosure is not particularly limited to this. If the flight route determination section 114 determines that a flight route is not entirely included in an extended visually observable area, the message display control portion 1122 may display, on the display screen, the warning message asking the operator to input a waypoint again, instead.

Figure 20:
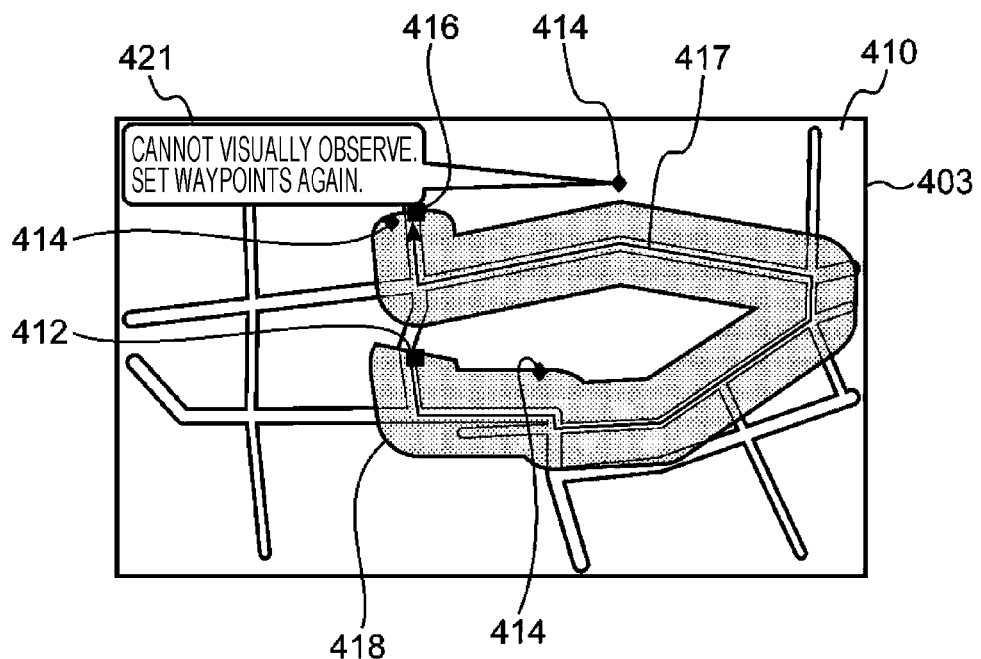
FIG. 20 is a diagram illustrating an example of a display screen on which a warning message is displayed in the modification of the second embodiment of the present disclosure.

FIG. 20 is a diagram illustrating an example of a display screen on which a warning message is displayed in the modification of the second embodiment of the present disclosure.

In FIG. 20, since a flight route is not entirely included in the extended visually observable area 418, a warning message 421 is displayed. For example, the warning message 421 indicates, "Cannot visually observe. Set waypoint again". As illustrated in FIG. 20, the warning message 421 is associated with one of input waypoints.

In this case, in step S68 illustrated in FIG. 16, the message display control portion 1122 displays a warning message asking the operator to input a waypoint again, and the operator inputs a waypoint again using the input unit 103. The process then returns to step S66.

If the flight route determination section 114 determines that a flight route is not entirely included in an extended visually observable area, the message display control portion 1122 may display, on the display screen, a warning message asking the operator to input another VO, instead. In this case, in step S68 illustrated in FIG. 16, the message display control portion 1122 displays, on the display screen, the warning message asking the operator to input another VO, and the visually observable area display control portion 1121 displays a VO visually observable area on the display unit 104. Next, the operator moves the VO visually observable area using the input unit 103, and the process returns to step S67. In step S67, whether the flight route is entirely included in the extended visually observable area and/or the VO visually observable area is determined.

Alternatively, if the flight route determination section 114 determines that a flight route is not entirely included in the extended visually observable area, the display control section 112 may display a button for selecting inputting of another movement route, inputting of another waypoint, or inputting of another VO.

Other Embodiments

The first and second embodiments have been described above as examples of the techniques disclosed herein. The techniques disclosed herein are not limited to these embodiments, and may be applied to embodiments obtained by making modifications, replacement, addition, omission, or the like to these embodiments. In addition, other embodiments can be obtained by combining together the components described in the first and second embodiments.

In addition, in the first or second embodiment, the server 30 may have a part of the functions of the control unit 105 and the storage unit 106 of the flight route generation apparatus 10. In this case, a flight route generation system may include a flight route generation server that generates a flight route of a drone and a terminal apparatus communicably connected to the flight route generation server.

The terminal apparatus includes a display unit, a flight route input reception unit, a flight route transmission unit, a visually observable area reception unit, a visually observable area display control unit, a warning message reception unit, a warning message display control unit, a visually observable area movement reception unit, a visually observable area transmission unit, a deletion instruction reception unit, and a warning message deletion control unit.

The flight route input reception unit receives a flight route input by an operator. The flight route transmission unit transmits the flight route input using the flight route input reception unit to the flight route generation server. The visually observable area reception unit receives, from the flight route generation server, a visually observable area, in which a VO who visually observes a drone can visually observe the drone. The visually observable area display control unit displays, on the display unit, the visually observable area received by the visually observable area reception unit. If the flight route is not included in the visually observable area, the warning message reception unit receives a warning message from the flight route generation server. The warning message display control unit displays, on the display unit, the warning message received by the warning message reception unit.

The visually observable area movement reception unit receives a movement of the visually observable area input by the operator. The visually observable area transmission unit transmits, to the flight route generation server, a new position of the visually observable area moved using the visually observable area movement reception unit. If, after the visually observable area is moved, the flight route is entirely included in the visually observable area, the deletion instruction reception unit receives an instruction to delete the displayed warning message from the flight route generation server. If the deletion instruction reception unit receives the instruction, the warning message deletion control unit deletes the warning message displayed on the display unit.

A method, an apparatus, a computer-readable non-transitory recording medium storing a program, and a terminal apparatus in the present disclosure can generate a flight route of a drone in an area in which an operator or a VO can visually observe the drone, and are effective as a method, an apparatus, a computer-readable non-transitory recording medium storing a program, and a terminal apparatus that generate a flight route of a drone.

What is claimed is:

1. A method used by an apparatus including an input and a display, the method comprising:
receiving, using the input, an unconfirmed flight route of a drone;
displaying the unconfirmed flight route and a visually observable area on the display, the visually observable area including a first area, within which an observer located at a first position is able to visually observe the drone, the observer being an operator of the drone or a first visual observer;
confirming, if the unconfirmed flight route is entirely included in the visually observable area, the unconfirmed flight route as a confirmed flight route; and
displaying, on the display, if at least a part of the unconfirmed route is not included in the visually observable area, a warning message indicating that the unconfirmed flight route is not confirmed.

2. The method according to claim 1, further comprising:
updating, if at least a part of the unconfirmed flight route is not included in the visually observable area, the visually observable area on the basis of a second position of a second visual observer, the updated visually observable area including a second area, within which the second visual observer located at the second position is able to visually observe the drone;
receiving, using the input, confirmation of the second position of the second visual observer; and
deleting, if the unconfirmed flight route is entirely included in the updated visually observable area, the warning message and confirming the unconfirmed flight route as a confirmed flight route.

3. The method according to claim 1,
wherein the unconfirmed flight route includes a first partial flight route included in the visually observable area and a second partial flight route not included in the visually observable area, and
wherein the first partial flight route and the second partial flight route are displayed in a distinguishable manner.

4. The method according to claim 1,
wherein a position of the observer is either fixed or not fixed,
wherein the visually observable area includes a third area whose position is not fixed and a fourth area whose position is fixed,
wherein the third area and the fourth area are displayed in a distinguishable manner,
wherein, if at least a part of the unconfirmed flight route is not included in the visually observable area, confirmation of the first position of the observer whose position is not fixed is received, and
wherein, if the unconfirmed flight route is entirely included in the visually observable area, the warning message is deleted, and the unconfirmed flight route is confirmed as a confirmed flight route.

5. The method according to claim 1, further comprising:
receiving, if at least a part of the unconfirmed flight route is not included in the visually observable area, a movement route for changing a position of the observer from the first position to a second position;
displaying, on the display, a track of the visually observable area based on the movement of the observer from the first position to the second position as an extended visually observable area; and
deleting, if the unconfirmed flight route is entirely included in the extended visually observable area, the warning message.

6. The method according to claim 1,
wherein the unconfirmed flight route is input by specifying a waypoint.

7. The method according to claim 5,
wherein the unconfirmed flight route is input by specifying a waypoint, and
wherein the unconfirmed flight route includes a third partial flight route based on the movement route and a fourth partial flight route connecting the third partial flight route and the waypoint.

8. An apparatus comprising:
an input that receives an unconfirmed flight route of a drone;
a display; and
circuitry which, in operation,
displays the unconfirmed flight route and a visually observable area on the display, the visually observable area including a first area, within which an observer located at a first position is able to visually observe the drone, the observer being an operator of the drone or a first visual observer,
confirms, if the unconfirmed flight route is entirely included in the visually observable area, the unconfirmed flight route as a confirmed flight route, and
displays, on the display, if at least a part of the unconfirmed route is not included in the visually observable area, a warning message indicating that the unconfirmed flight route is not confirmed.

9. A computer-readable non-transitory recording medium storing a program for controlling an apparatus including an input and a display, the program, when executed by a processor, causing the processor to implement a method comprising:

receiving, using the input, an unconfirmed flight route of a drone;
displaying the unconfirmed flight route and a visually observable area on the display, the visually observable area including a first area, within which an observer located at a first position is able to visually observe the drone, the observer being an operator of the drone or a first visual observer;
confirming, if the unconfirmed flight route is entirely included in the visually observable area, the unconfirmed flight route as a confirmed flight route; and
displaying, on the display, if at least a part of the unconfirmed route is not included in the visually observable area, a warning message indicating that the unconfirmed flight route is not confirmed.

10. A terminal apparatus comprising:
one or more memories; and
circuitry which, in operation,
receives an unconfirmed flight route of a drone,
transmits the unconfirmed flight route to a server,
receives, from the server, a position of an operator of the drone or of a first visual observer, a visually observable area based on the position of the operator or of the first visual observer, and a warning message indicating, if at least a part of the unconfirmed flight route is not included in the visually observable area, that the unconfirmed flight route is not confirmed, and
displays the visually observable area and the warning message.

* * * * *